US010096180B2

(12) United States Patent
Warnitz et al.

(10) Patent No.: US 10,096,180 B2
(45) Date of Patent: Oct. 9, 2018

(54) SYSTEM FOR MONITORING ACCESS TO A RESTRICTED AREA, COMPRISING A MODULE HOUSED BELOW OR ABOVE THE GATE

(71) Applicant: THALES, Neuilly sur Seine (FR)

(72) Inventors: Philippe Warnitz, Bretigny-sur-Orge (FR); Roger Bourgely, Bretigny-sur-Orge (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 15/038,010

(22) PCT Filed: Nov. 20, 2014

(86) PCT No.: PCT/EP2014/075184

§ 371 (c)(1),
(2) Date: Jun. 10, 2016

(87) PCT Pub. No.: WO2015/075138

PCT Pub. Date: May 28, 2015

(65) Prior Publication Data

US 2016/0292939 A1 Oct. 6, 2016

(30) Foreign Application Priority Data

Nov. 20, 2013 (FR) ..................................... 13 02680

(51) Int. Cl.

| | |
|---|---|
| ***B60R 25/00*** | (2013.01) |
| ***G07C 9/00*** | (2006.01) |
| ***G07C 9/02*** | (2006.01) |

(52) U.S. Cl.

CPC ..... *G07C 9/00031* (2013.01); *G07C 9/00944* (2013.01); *G07C 9/02* (2013.01); *G07C 2209/62* (2013.01)

(58) Field of Classification Search

None

See application file for complete search history.

(56) References Cited

U.S. PATENT DOCUMENTS 4,785,580 A * 11/1988 Olesen .................... E05D 15/02 49/44
4,853,524 A * 8/1989 Yamaguchi .......... G06K 7/1097 235/382

(Continued)

FOREIGN PATENT DOCUMENTS

| | | |
|---|---|---|
| DE | 3602303 A1 | 7/1987 |
| EP | 2299196 | 3/2011 |
| WO | WO 2005/015507 | 2/2005 |

OTHER PUBLICATIONS

Search Report dated Oct. 9, 2014 for French Patent Application 1302680 filed on Nov. 20, 2013.

(Continued)

*Primary Examiner* — Curtis King

(74) *Attorney, Agent, or Firm* — Knobbe Martens Olson & Bear, LLP

(57) ABSTRACT

A system for monitoring access to a restricted area, comprising a module housed below or above the gate is disclosed. In one aspect, the system includes at least one monitor configured to monitor entry and/or exit in the restricted area of users using a pedestrian gate, specific to the monitor, for the entry and/or the exit in the restricted area. The monitor can include a circulation authorization system and a signing system configured to show a user whether he/she is authorized to use the gate. The signing system can include at least one peripheral configured to change state and a control module configured to control the at least one peripheral. The control module can be housed in a control compartment under the gate.

7 Claims, 15 Drawing Sheets

(56) References Cited

U.S. PATENT DOCUMENTS

| | | | | | |
|---|---|---|---|---|---|
| 5,146,710 | A | 9/1992 | Caldwell | | |
| 5,333,410 | A * | 8/1994 | Tetherton | G07C 9/02 | 49/25 |
| 5,845,692 | A * | 12/1998 | Kellem | E05G 5/003 | 160/1 |
| 5,963,345 | A * | 10/1999 | Smith | B60Q 1/50 | 359/1 |
| 6,070,146 | A | 5/2000 | Mimata | | |
| 7,248,151 | B2 * | 7/2007 | Mc Call | B60R 25/2045 | 340/425.5 |
| 8,378,988 | B1 * | 2/2013 | Artino | H04N 7/186 | 235/382 |
| 2001/0017585 | A1 * | 8/2001 | Kobayashi | G07C 9/02 | 340/5.66 |
| 2002/0145505 | A1 * | 10/2002 | Sata | G07B 15/00 | 340/5.2 |
| 2004/0002894 | A1 * | 1/2004 | Kocher | G07C 9/00087 | 705/13 |
| 2004/0016515 | A1 * | 1/2004 | Towley | E06B 9/17046 | 160/133 |
| 2004/0262383 | A1 * | 12/2004 | Zielinski | G07C 9/00126 | 235/382 |
| 2005/0040232 | A1 | 2/2005 | Maloney | | |
| 2005/0092831 | A1 | 5/2005 | Sandoval et al. | | |
| 2009/0102603 | A1 * | 4/2009 | Fein | G03H 1/0005 | 340/5.81 |
| 2009/0128284 | A1 * | 5/2009 | Floyd | G07C 9/02 | 340/5.3 |
| 2009/0314833 | A1 | 12/2009 | Ruiz | | |
| 2010/0019919 | A1 * | 1/2010 | Peng | B66B 13/26 | 340/686.6 |
| 2010/0308108 | A1 * | 12/2010 | Choi | G07C 9/00087 | 235/382 |
| 2013/0021136 | A1 * | 1/2013 | Brunetti | G07C 9/025 | 340/5.7 |
| 2013/0120108 | A1 * | 5/2013 | Kocznar | E06B 11/085 | 340/5.7 |
| 2014/0102003 | A1 * | 4/2014 | Talpe | E06B 11/08 | 49/46 |
| 2014/0132390 | A1 * | 5/2014 | Loveland | H05B 37/0227 | 340/5.8 |
| 2014/0266604 | A1 * | 9/2014 | Masood | G06K 9/00221 | 340/5.83 |
| 2016/0171805 | A1 * | 6/2016 | Jang | G07C 9/00158 | 382/118 |
| 2017/0241185 | A1 * | 8/2017 | Osann, Jr. | E05F 15/74 | |

OTHER PUBLICATIONS

Search Report and Written Opinion dated Feb. 27, 2015 for International Patent App. No. PCT/EP2014/075184 filed on Nov. 20, 2014.

* cited by examiner

SYSTEM FOR MONITORING ACCESS TO A RESTRICTED AREA, COMPRISING A MODULE HOUSED BELOW OR ABOVE THE GATE

CROSS-REFERENCE TO RELATED APPLICATIONS

This application is a U.S. National Phase of International Application No. PCT/EP2014/075184, filed Nov. 20, 2014, which claims benefit under 35 U.S.C. § 119 of French Application No. 13 02680, filed Nov. 20, 2013, which is herein incorporated by reference in its entirety.

BACKGROUND

Technological Field

The described technology generally relates to a system for monitoring access to a restricted area, of the type comprising at least one monitoring device for monitoring the entrance and/or the exit in the restricted area of users using a pedestrian gate, specific to the monitoring device, of the entrance and/or of the exit of the restricted area, the monitoring device comprising:

a system for authorizing circulation, comprising a central unit and at least one document reader, said or each document reader being adapted so as to communicate with an access document of a user, and the central unit being adapted for determining whether the user owner of the access document is authorized to use the gate, and a signing system adapted for showing the user whether he/she is either authorized or not to use the gate, said signing system comprising at least one peripheral adapted for changing state and a module for controlling said or each peripheral, the control module being adapted for controlling the change of state of said or each peripheral when the central unit of the circulation authorization system has determined that the user owner of the displacement document is authorized to use the gate.

Description of the Related Technology

Such access control systems are known, notably from WO 2005/015507. They generally control the access to an inside of a building or to a common transportation network. Most often, a peripheral of the signing system is a device for obstructing the gate which comprises a mobile member forming an obstacle and an actuator for controlling the displacement of said obstacle so as to selectively obstruct or clear the gate. The obstacle is commonly formed by a barrier or a gate.

On a current basis, the circulation authorization system and the signing system, except for the obstacle, are housed in a box delimiting a lateral edge of the pedestrian gate.

Ordinarily, the access control system comprises a plurality of access control devices juxtaposed to each other and which will together close a corridor for accessing the restricted area, said corridor typically extending between two walls of the building to which access should be controlled. The boxes of the different access control devices delimit together the pedestrian gates. For a predetermined corridor width, the number of gates which it is possible to form in said corridor therefore depends on the width of each gate and on the size of each box.

A constant requirement of the access control systems is to maximize the pedestrian flow. For this purpose, it is for example possible to increase the number of monitoring devices placed in a same corridor by reducing the size of each monitoring device. However, this possibility is limited by the fact that the width of the pedestrian gates should remain sufficient for allowing easy crossing of the pedestrians and that the boxes should have a minimum size in order to efficiently protect the equipment which they contain.

SUMMARY OF CERTAIN INVENTIVE ASPECTS

An object of the described technology is to reduce the size of the monitoring devices of an access control system to a restricted area.

For this purpose, one aspect of the described technology according to a first embodiment, is an access control system of the aforementioned type, wherein the control module is housed in a compartment under the gate.

According to particular alternatives of the described technology, this access control system has one or several of the following features, taken individually or according to all technically possible combination(s):

a peripheral of the signing system is a device for obstructing the gate comprising an obstacle positioning device adapted for positioning an obstacle through the gate, said obstacle positioning device being housed in a compartment under the gate;

the obstacle is a hologram, and the obstacle positioning device is a hologram generator;

the obstacle comprises at least one movable member between a deployed configuration, in which it extends through the gate, and a retracted configuration, in which it is cleared away from said gate, the obstacle positioning device being formed with an actuator mechanically connected to said or each movable member in order to drive it between its deployed configuration and its retracted configuration;

a peripheral of the signing system is a display, said display being housed under the gate;

said or each monitoring device comprises a module for supplying power to said monitoring device, for shaping an electric current powering the monitoring device, the power supply module being housed in a compartment under the gate;

it comprises a ventilation system of said or each compartment positioned under said or each gate, the ventilation system comprising a system for sucking up air fluidically connected to said or each compartment for generating a negative pressure in said or each compartment;

the suction system is fluidically connected to said or each compartment through a ventilation conduit, and the access control system includes a power supply cable for the electrical connection of said or each monitoring device to an electricity network, the ventilation conduit forming a grommet for said power supply cable;

said or each monitoring device comprises at least one delimitation member of a lateral edge of the gate, said delimitation member having an air intake orifice in fluidic communication with at least one ventilated compartment;

said or each monitoring device comprises a sensor for detecting at least one user present in a detection area of the sensor, said detection area comprising at least one portion of the gate; and it comprises a plurality of access control devices juxtaposed to each other.

Another aspect includes, according to a second embodiment, an access control system of the aforementioned type, wherein the control module is housed in a compartment above the gate.

According to particular alternatives of the described technology, this access control system has one or several of the following features, taken individually or according to all the technically possible combination(s):

a peripheral of the signing system is a device for obstruction of the gate comprising an obstacle positioning device adapted for positioning an obstacle across the gate, said obstacle positioning device being housed in a compartment above the gate;

the obstacle is a hologram, and the obstacle positioning device is a hologram generator;

the obstacle comprises at least one movable member between a deployed configuration, wherein it extends across the gate, and a retracted configuration, in which it is cleared away from said gate, the obstacle positioning device being formed by an actuator mechanically connected to said or to each movable member for driving it between its deployed configuration and its retracted configuration;

a peripheral of the signing system is a display, said display being housed above the gate;

said or each monitoring device comprises a module for supplying power to said monitoring device, for shaping an electric current for supplying power to the monitoring device, the power supply module being housed in a compartment above the gate;

the access control system comprises a ventilation system of said or each compartment positioned above said or each gate, the ventilation system comprising a system for air suction or injection fluidically connected to said or each compartment for generating a circulation of air in said or each compartment, for example by negative pressure or positive pressure in said or each compartment;

the suction system is fluidically connected to said or each compartment through a ventilation conduit, and the access control system includes a power supply cable for the electric connection of said or each monitoring device to an electricity network, the ventilation conduit forming a grommet for said power supply cable;

said or each monitoring device comprises at least one member for delimiting a lateral edge of the gate;

said or each monitoring device comprises a sensor for detecting at least one user present in a detection area of the sensor, said detection area comprising at least one portion of the gate; and the access control comprises a plurality of access control devices juxtaposed to each other.

BRIEF DESCRIPTION OF THE DRAWINGS

Other features and advantages of the described technology will become apparent upon reading the description which follows, only given as an example and made with reference to the appended drawings, wherein.

DETAILED DESCRIPTION OF CERTAIN INVENTIVE EMBODIMENTS

Figure 1:
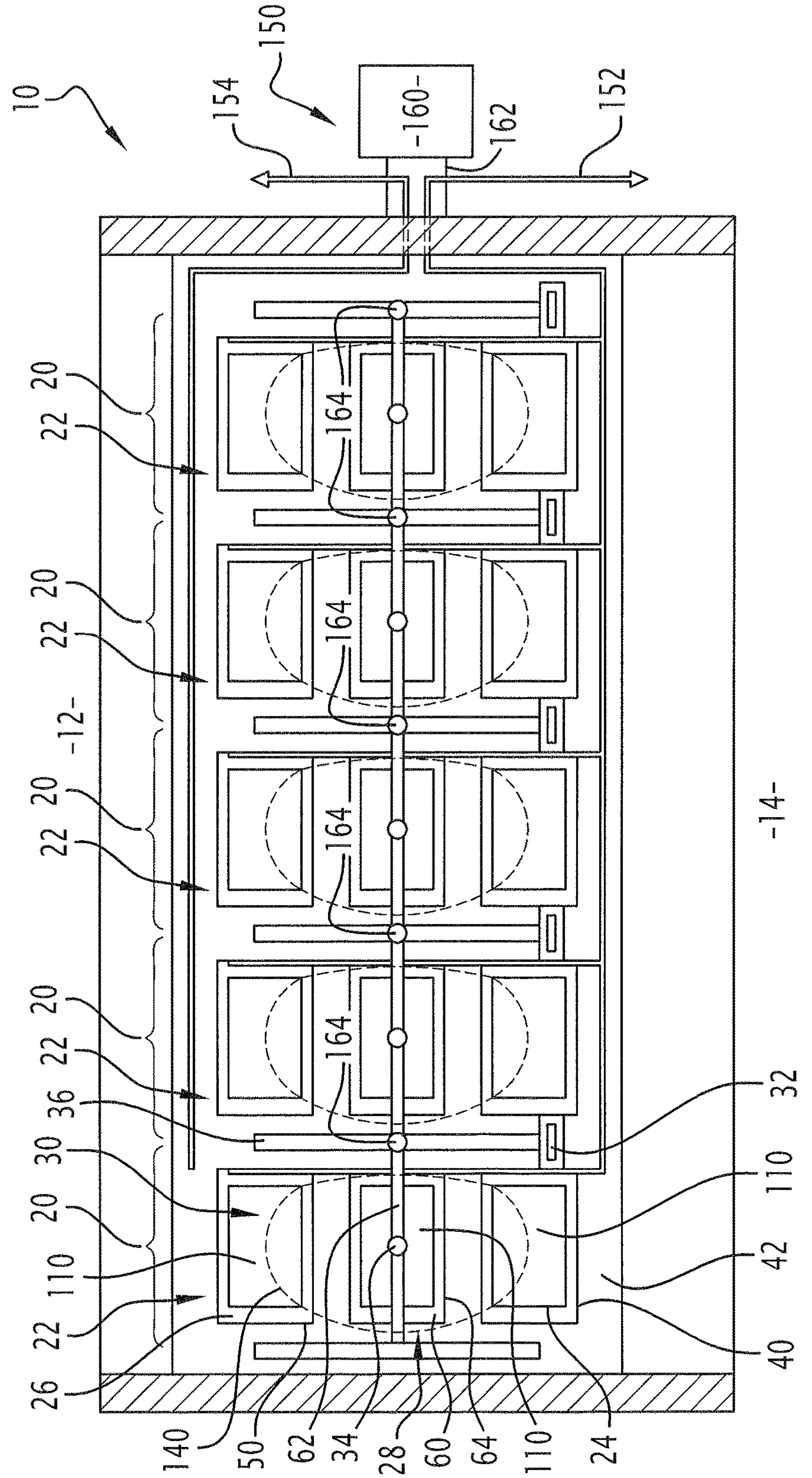
FIG. 1 is a schematic top view of an access control system according to a first exemplary embodiment of the first embodiment of the described technology.
Figure 2:
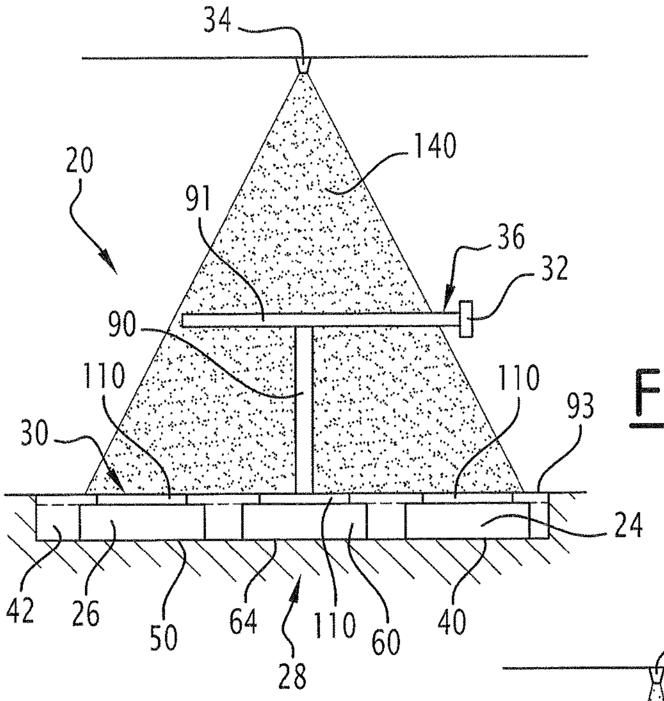
FIG. 2 is a schematic side view of a device for monitoring the access control system of FIG. 1.
Figure 3:
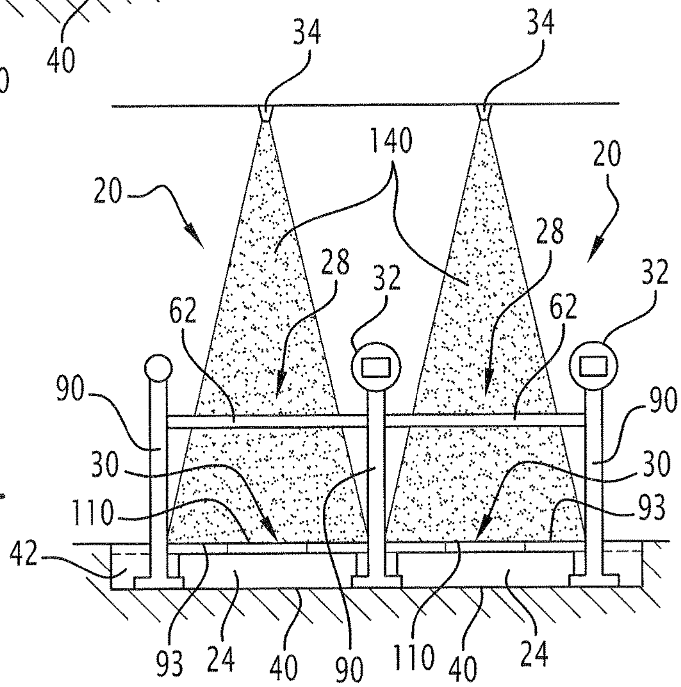
FIG. 3 is a schematic front view of a portion of the access control system of FIG. 1.

The access control system 10, illustrated in FIGS. 1 to 3, is intended to control the entry of users into a restricted area 12. Alternatively, the access control system 10 is intended to exclusively control the exit, or the entry and exit of users in the restricted area 12.

For this purpose, the access control system 10 comprises a plurality of monitoring devices 20 juxtaposed to each other so as to isolate the restricted area 12 from a free area 14, any user passing from the restricted area 12 to the free area 14 having to necessarily use a pedestrian gate 22 specific to one of the monitoring devices 20.

The restricted area 12 is typically an interior space of a building, a network of common transportation, or an amusement park. It is reserved for the possessors of a valid access document.

Each monitoring device 20 is adapted for controlling the entrance into the restricted area 12 of users using the pedestrian gate 22 specific to the monitoring device 20. Alternatively, each monitoring device 20 is adapted for exclusively monitoring the exit, or the entry and the exit of users passing through the pedestrian gate 22.

By "pedestrian" gate, it is generally meant that each gate 22 is adapted for the crossing of a pedestrian, desirably a pedestrian in a Rollator, and of his/her luggage, but not of an automobile. For this purpose, each gate 22 typically has a width comprised between 40 cm and 80 cm.

Figure 5:
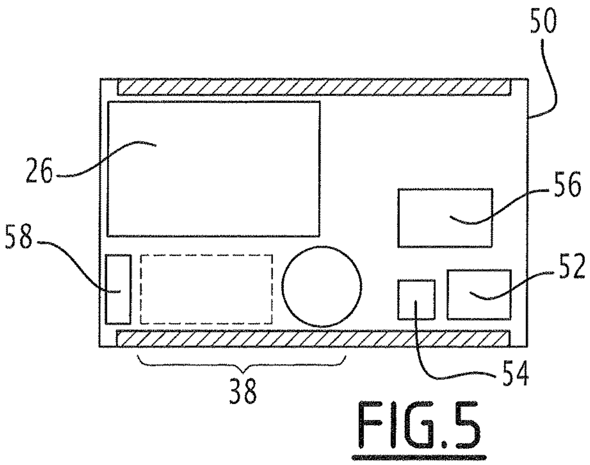
FIG. 5 is a schematic top view of a module for controlling the monitoring device of FIG. 2.

Each monitoring device 20 comprises a power supply module 24, a control module 26, a device 28 for obstruction of the gate 22 specific to the monitoring device 20, two members 36 for delimiting the lateral edges of the gate 22, a sensor 34, and a device for interacting with the user comprising a display device on the ground 30, a document reader 32 and a member for emission of sound 38 (FIG. 5).

The power supply module 24 is adapted so as to shape an electric current for supplying power to the monitoring device 20, so as to provide a stable electric power supply and without any cutting off to the remainder of the monitoring device 20. This type of power supply module is known and is generally designated under the name of uninterruptible power supply or UPS.

The power supply module 24 is housed in a first compartment 40 positioned in a cavity 42 extending under the gate 22 specific to the monitoring device 20. In the illustrated example, the cavity 42 is common to all the monitoring devices 20 and extends under all the gates 22.

Figure 4:
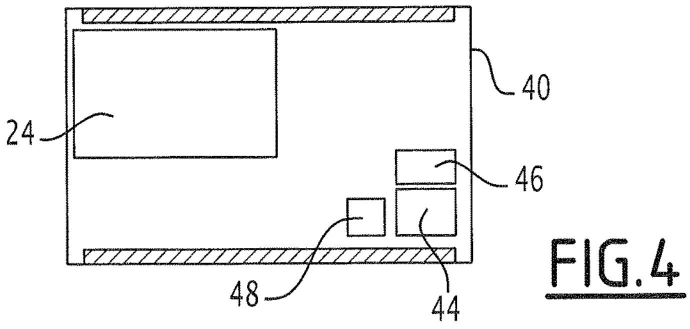
FIG. 4 is a schematic top view of a module for supplying power to the monitoring device of FIG. 2.

With reference to FIG. 4, the compartment 40 contains, in addition to the power supply module 24, an outlet 44 for connecting to an electricity network for powering the access control system 10, an outlet 46 for outputting the shaped electric current, and a maintenance outlet 48, the power supply module 24 being electrically connected to each of the outlets 44, 46, 48.

Referring back to FIGS. 1 and 2, the control module 26 is a computer, for example an industrial computer adapted so as to be powered with a voltage of 12 V. It has a communication capability (not shown) with the obstruction device 28, the display device 30, the document reader 32, the sensor 34 and the sound emission member 38.

The control module 26 is housed in a second compartment 50 positioned in the cavity 42.

With reference to FIG. 5, said compartment 50 contains, in addition to the control module 26, a power supply socket 52 electrically connected to the output outlet 42 of the compartment 40, a maintenance socket 54, a transformer 56 for adapting the current provided to the power supply outlet 52 at the power supply voltage of the control module 26, a keyboard 58, for programming the control module 26, and the sound emission member 38.

Each delimitation member 36 is common to the monitoring device 20 and to one of the monitoring devices 20 which is adjacent to it, except in the case when the monitoring device 20 is only juxtaposed to a single other monitoring device 20, in which case only one of the delimitation members 36 is common to the monitoring device 20 and to a monitoring device 20 which is adjacent to it.

Each delimitation member 36 comprises a post 90 and optionally a stringer 91. The post 90 is substantially oriented vertically. The stringer 91 is oriented substantially horizontally, parallel to the axis of the gate 22. The stringer 91 is at a distance from the floor 93 of the gate 22, and is borne by the post 90.

Figure 14:
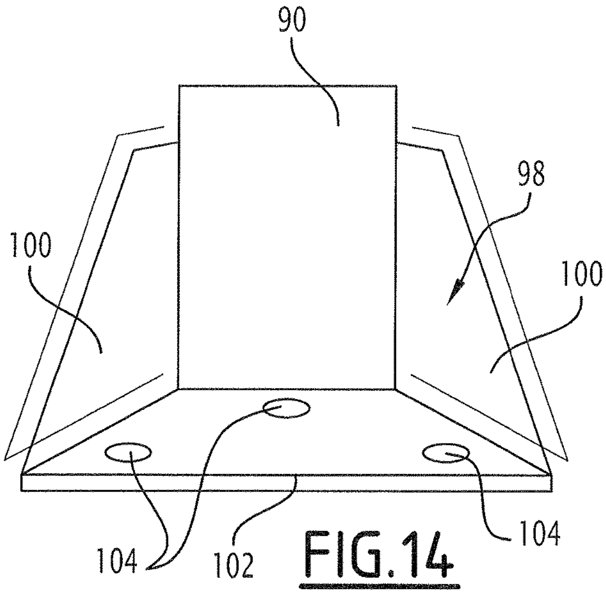
FIG. 14 is a top view of a device for attaching to the ground a post of the device for obstructing the gate of FIG. 11.

Each post 90 desirably has, as illustrated in FIG. 14, a horizontal section elongated parallel to the axis of the gate 22.

Each post 90 is desirably formed of steel.

Figure 15:
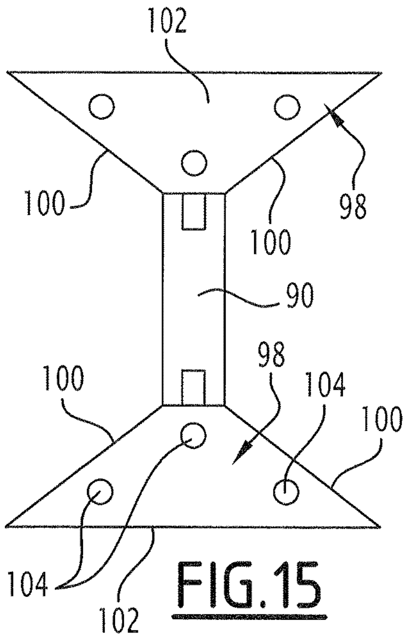
FIG. 15 is a perspective view of a member for attaching to the ground the attachment device of FIG. 14.

With reference to FIGS. 14 and 15, each post 90 is held on the ground by two attachment devices 98. These attachment devices 98 are positioned on each side of the post 90 along the axis of the gate 22. Each attachment device 98 is secured to a lower end of the post 90.

Each attachment device 98 is desirably formed of steel.

Each attachment device 98 comprises two flanges 100 forming together an angle comprised between 90° and 160°, and a plate 102 connecting the flanges 100 to each other.

Each flange 100 is substantially oriented vertically, and the plate 102 is substantially oriented horizontally. The flanges 100 converge towards the post 90. This configuration of the attachment device 98 allows good transmission of the forces exerted on the post 90, along the axis of the gate 22, towards the ground. The resistance of the post 90 to detachment is thus increased.

The plate 102 has a plurality of orifices 104 for letting through attachment members (not shown), for example screws, for attaching the plate 102 to the ground.

The attachment devices 98 are positioned in the cavity 42.

Returning to FIGS. 1 to 3, the obstruction device 28 comprises an obstacle positioning device 60, adapted for positioning an obstacle 62 across the gate 22 specific to the monitoring device 20. This obstacle positioning device 60 is housed in a third compartment 64 positioned in the cavity 42.

Figure 6:
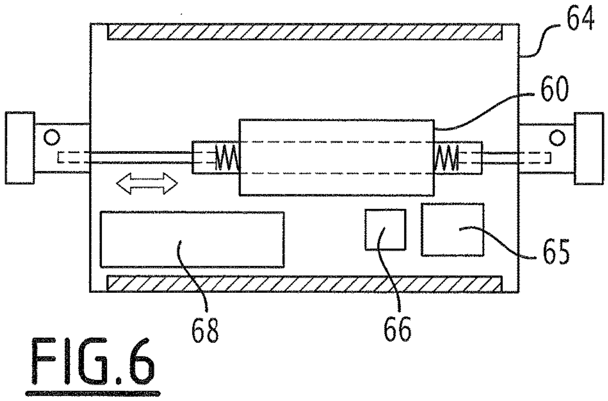
FIG. 6 is a schematic top view of an obstacle positioning device of the monitoring device of FIG. 2.

With reference to FIG. 6, the compartment 64 contains, in addition to the obstacle positioning device 60, a power supply outlet 65 electrically connected to the output socket 42 of the compartment 40, a maintenance socket 66, and an electric converter 68 for converting the current provided at the power supply outlet 65 into a current adapted for supplying power to the obstacle positioning device 60.

According to a first exemplary embodiment of the first embodiment of the described technology, illustrated in FIGS. 6 to 16, the obstacle 62 comprises at least one movable member 70 between a deployed configuration, in which it extends through the passage 22, and a retracted configuration, in which it is cleared from said gate 22, and the obstacle positioning device 60 is formed by an actuator mechanically connected to said or each movable member 70 for driving it between its deployed configuration and its retracted configuration.

In the illustrated example, the obstacle 62 is formed with two movable members 70, said movable members 70 being barriers. Alternatively, the movable members 70 are gates.

Figure 11:
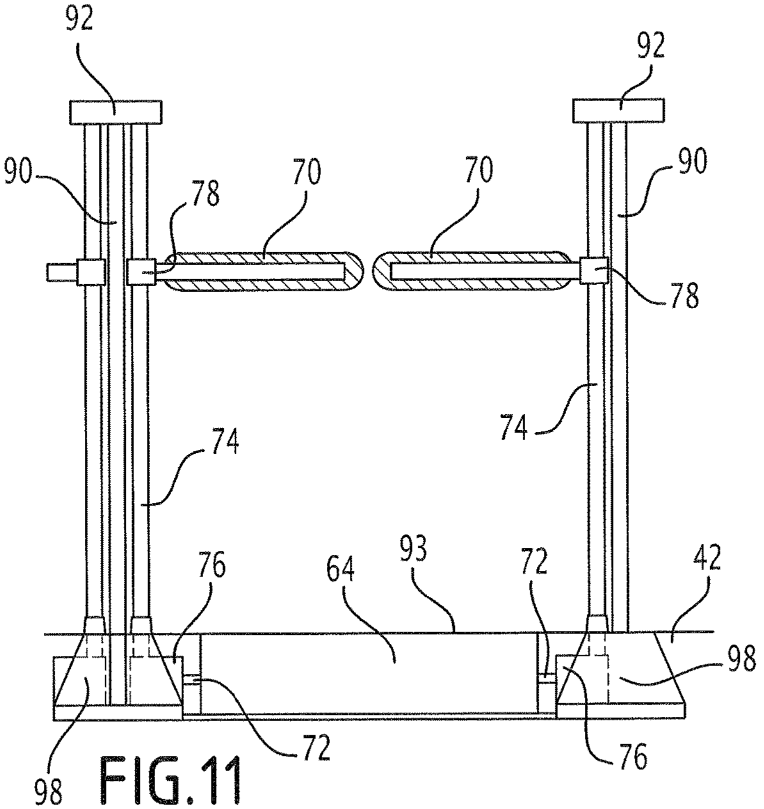
FIG. 11 is a schematic front view of a device for obstruction of the gate of the monitoring device of FIG. 2, according to a first alternative.
Figure 12:
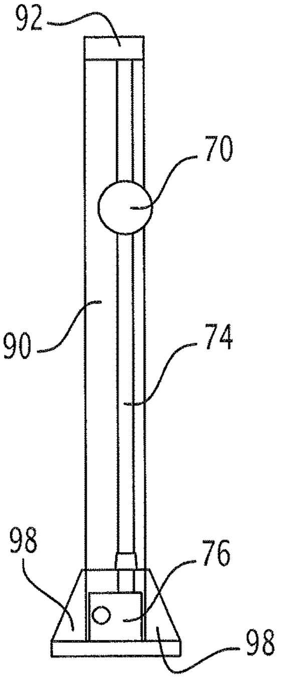
FIG. 12 is a schematic side view of the device for obstruction of the gate of FIG. 11.
Figure 13:
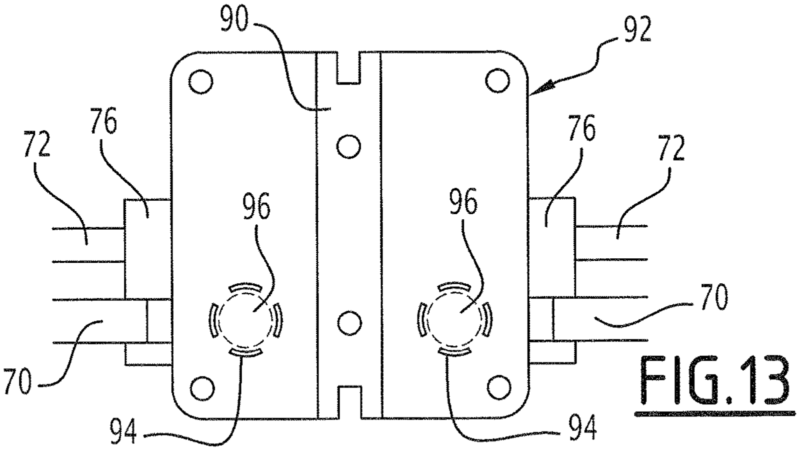
FIG. 13 is a schematic top view of the device for obstructing the crossing of FIG. 11.
Figure 16:
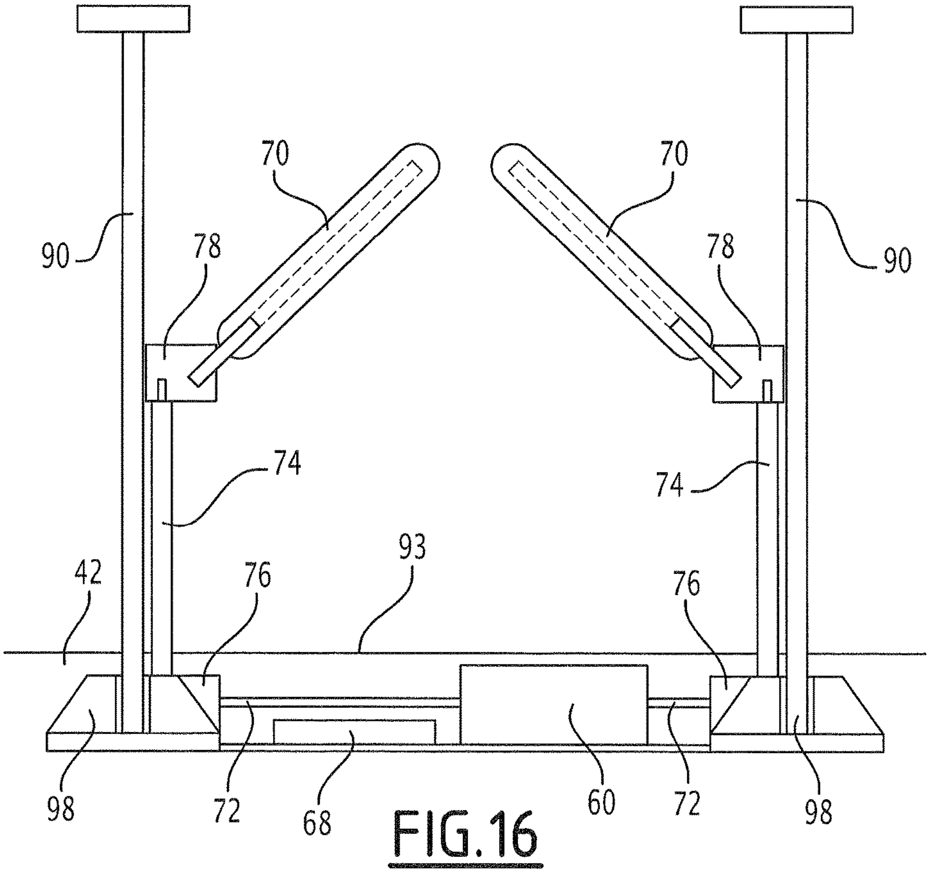
FIG. 16 is a schematic front view of a device for obstruction of the gate of the monitoring device of FIG. 2, according to a second alternative, each of FIGS. 17 to 20 is a schematic front view of a device for obstructing a gate of the monitoring device of FIG. 2, according to a third alternative, each view showing a different state of the obstruction device.
Figure 17:
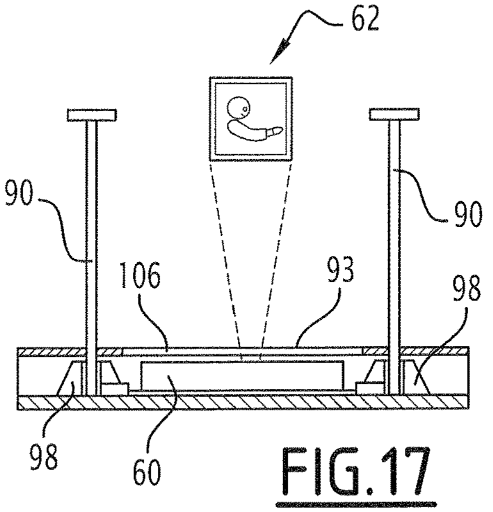
Figure 18:
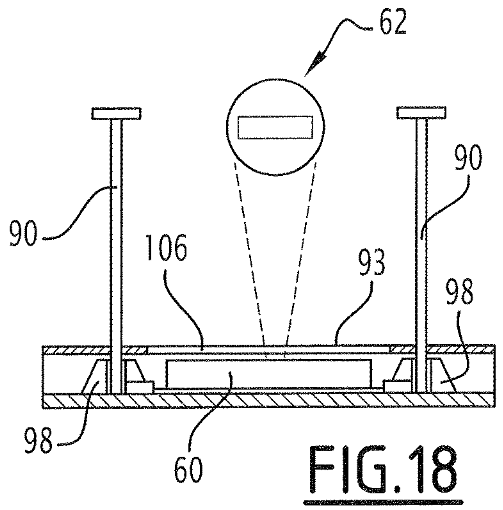
Figure 19:
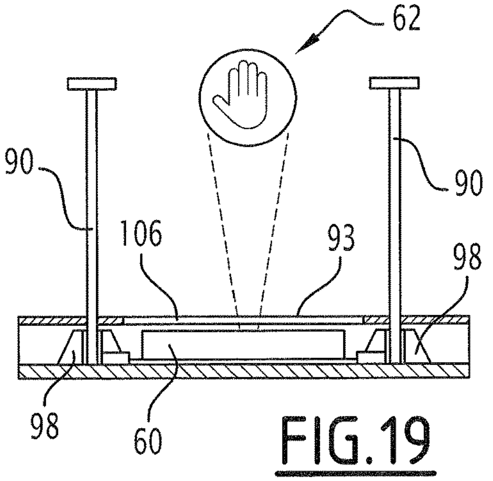

Each barrier 70 is adapted so as to be oriented horizontally and perpendicularly to the axis of the gate 20 when it is in a deployed configuration, and:

according to a first alternative, illustrated in FIGS. 11 to 13, in order to be oriented parallel to the axis of the gate 20 when it is in a retracted position, or according to a second alternative, illustrated in FIG. 16, for being oriented vertically when it is in a retracted configuration.

The actuator 60 is an electric motor, for example a servomotor with variable speed. It desirably has as many output shafts 80 as there are movable members 70. In the illustrated example, the actuator 60 thus has two output shafts 80. Alternatively, the obstacle 62 is formed with a single movable member 70, for example a gate, and the actuator 60 then has a single output shaft 80.

Figure 7:
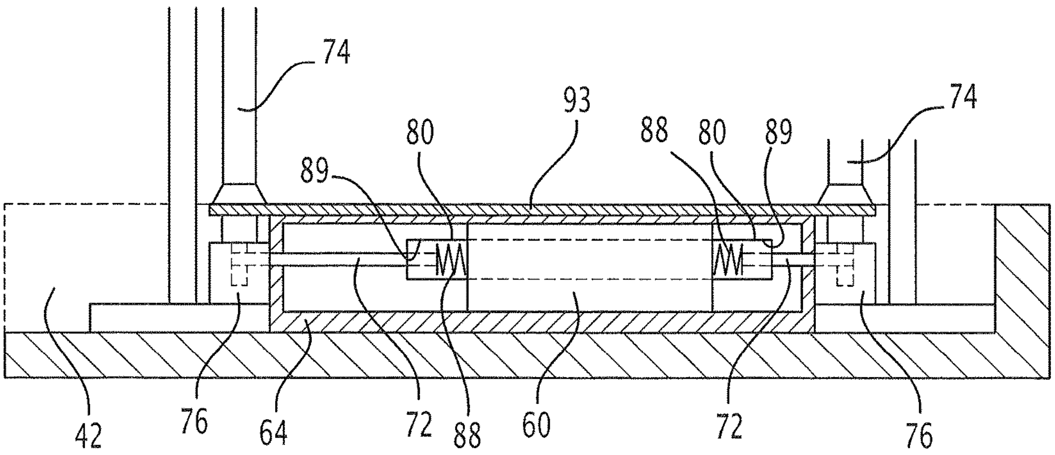
FIG. 7 is a schematic front view of the obstacle positioning device of FIG. 6.
Figure 8:
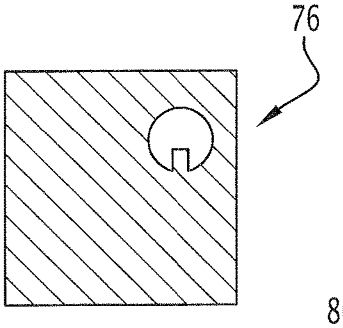
FIG. 8 is a schematic side view of an angled member of the obstacle positioning device of FIG. 6.
Figure 9:
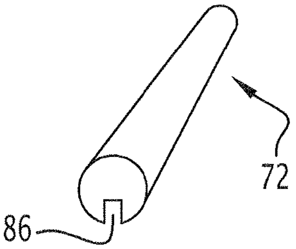
FIG. 9 is a schematic perspective view of an intermediate shaft of the obstacle positioning device of FIG. 6.
Figure 10:
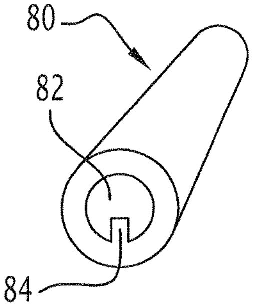
FIG. 10 is a schematic perspective view of a driving shaft of the obstacle positioning device of FIG. 6.

With reference to FIG. 7, the mechanical connection between the actuator 60 and each movable member 70 comprises an intermediate shaft 72, substantially oriented horizontally and perpendicularly to the axis of the gate 22, an obstacle shaft 74, substantially oriented vertically, a first device 76 for coupling the obstacle shaft 74 with the intermediate shaft 72, and a second device 78 for coupling the obstacle shaft 74 with the movable member 70.

The intermediate shaft 72 rotatably around its axis is secured to an output shaft 80 of the actuator 60. In the illustrated example, the output shaft 80 defines a cavity 82 for receiving the intermediate shaft 72, and the coupling of the output shaft 80 with the intermediate shaft 72 is achieved by cooperation of a rib 84 (FIG. 10) radially protruding from a wall of the cavity 82 with an axial groove 86 (FIG. 9) made in the intermediate shaft 72. Returning to FIG. 7, a compression spring 88 is positioned in the cavity 82 and presses against a bottom (not shown) of the cavity 82 and against an end 89 of the intermediate shaft 72 so as to urge the shaft 72 outwards from the cavity 82. This gives the possibility of facilitating the installation of the obstruction device 28.

The obstacle shaft 74 runs along the post 90 of one of the delimitation members 36 of the monitoring device 20.

The first coupling device 76 is adapted so that the rotation of one of the shafts 72, 74 around its axis drives into rotation the other shaft 72, 74 around its axis. For this purpose, the first coupling device 76 is for example an angled gearbox such as the gearbox Slide-Rite™ from Tolomatic.

According to the alternative of FIGS. 11 to 13, the second coupling device 78 is a clamping ring, secured to the movable member 70 and tightened around the obstacle shaft 74. The movable member 70 and the obstacle shaft 74 are thus rotatably secured around the axis of the obstacle shaft 74.

In order to stiffen the obstacle shaft 74, the post 90 bordered by said shaft 74 then bears, at its upper end, a cap 92 defining an orifice 94 (FIG. 13) for receiving an upper end 96 of said obstacle shaft 74. Thus, the obstacle shaft 74 is held at its lower and upper ends, which avoids its flexing.

According to the alternative of FIG. 16, the second coupling device 78 is adapted so that the rotation of the obstacle shaft 74 around its axis drives the mobile member 70 into rotation around an axis substantially parallel to the axis of the gate 22. For this purpose, the second coupling device 78 is for example an angled gearbox such as the gearbox Slide-Rite™ from Tolomatic.

In order to stiffen the obstacle shaft 74, the second coupling device 78 is secured to the post 90 bordered by said shaft 74. Thus, the obstacle shaft 74 is held at its lower and upper ends, which avoids its flexing.

The intermediate shafts 72 are aligned transversely with each other. In other words, the axes of the intermediate shafts 72 are comprised in a same vertical plane.

The obstacle shafts 74 are transversely aligned with each other. In other words, the axes of the obstacle shafts 74 are comprised in a same plane perpendicular to the axis of the gate 22.

According to a second exemplary embodiment of the first embodiment of the described technology, illustrated in FIGS. 17 to 20, the obstacle 62 is a hologram, and the obstacle positioning device 60 is a hologram generator.

The hologram generator 60 is adapted for generating the hologram 62 so that it extends across the gate 22. For this purpose, the hologram generator 60 has on its top a window (not shown) for projecting a hologram, and said window is covered with a transparent plate 106 forming a portion of the floor 93 of the gate 22.

Figure 20:
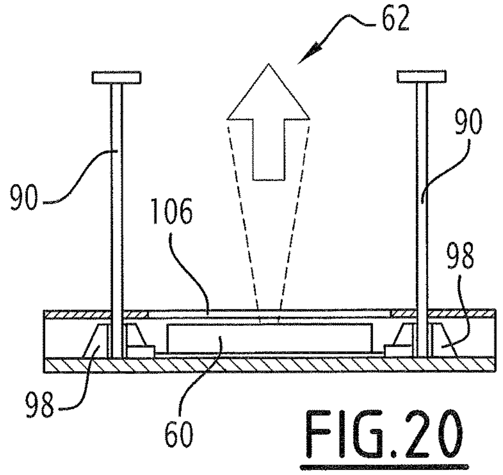

The hologram generator 60 is adapted for giving different aspects to the hologram 62, depending on whether the user is prompted to show an access document (FIG. 17), whether the crossing of the gate 22 is forbidden (FIG. 18), whether the user has shown an invalid access document (FIG. 19) or whether the user has shown a valid access document (FIG. 20).

The compartments 40, 50, 64 are positioned under the gate 22 and are juxtaposed to each other along the axis of the gate 22. The compartment 64 is at right angles to the obstacle 62. The compartments 40, 50 are positioned on either side of the obstacle 62.

Each compartment 40, 50, 64 may be handled independently of the two other compartments 40, 50, 64. It is thus possible to withdraw one of the compartments 40, 50, 64 from the cavity 42 while leaving the other compartments 40, 50, 64 in the cavity 42. This gives the possibility of easily replacing the power supply module 24, the control module 26 or the obstacle positioning device 28 without touching the other portions of the monitoring device 20, or even suppressing the obstacle positioning device 28. The monitoring device 20 thus has great modularity.

Alternatively (not shown), the power supply module 24, the control module 26 and the obstacle positioning device 60 are housed in a same compartment, said compartment for example being formed by the cavity 42.

Referring back to FIGS. 1 to 3, the display device 30 comprises a plurality of displays 110 positioned under the gate 22. In particular, each display 110 is positioned above a respective compartment 40, 50, 64.

Each display 110 is positioned under the gate 93, which is transparent at right angles to the display 110. Alternatively, each display 110 forms a portion of the flooring 93.

Each display 110 is for example a display of light-emitting diodes.

The display device 30 also comprises a module (not shown) for controlling the displays 110. The controlling module is programmed so as to control the display, with the displays 110, of information related to the availability of the gate 22, to the authorization or to the prohibition of crossing the crossing 22, or to the signaling of an unauthorized maneuver, such as a fraudulent attempt. Optionally, the controlling module is programmed for controlling the display, with the displays 110, of messages of an informing nature, or of advertising information, such as advertising videos.

Figure 21:
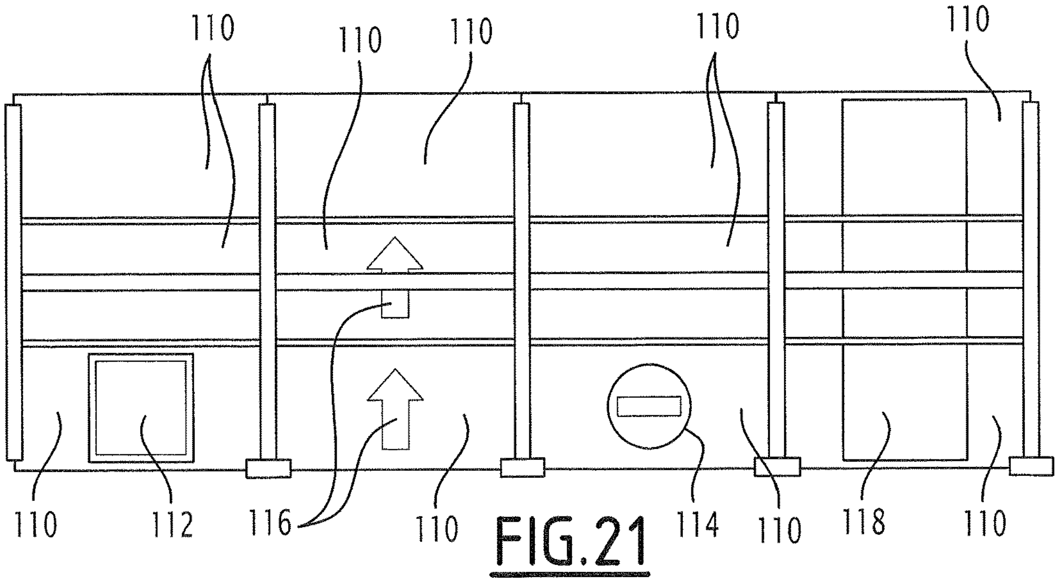
FIG. 21 is a view, similar to that of FIG. 1, of a portion of the access control system.

With reference to FIG. 21, the information related to the availability of the gate 22 is for example shown as a pictogram 112 illustrating a user showing an access document, when the gate 22 is available, or a "no entry" panel 114 when the gate 22 is unavailable. The information related to the authorization of passing through the gate 22 are for example shown as green arrows 116 oriented in the direction of displacement of the user having shown his/her access document. The information related to the signaling of an unauthorized maneuver is for example shown as blinking 118 in an alarming color, such as orange or red, of the whole of the display surface area of the displays 110.

Figure 22:
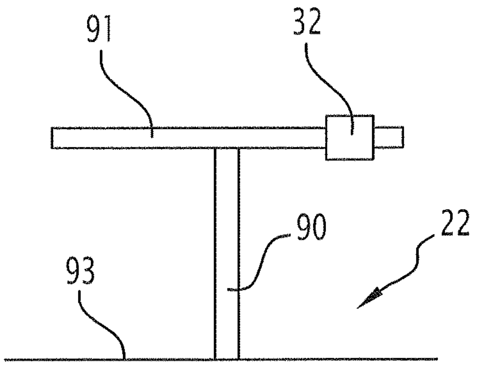
FIG. 22 is a schematic side view of a device for monitoring an access control system according to a second exemplary embodiment of the first embodiment of the described technology.
Figure 23:
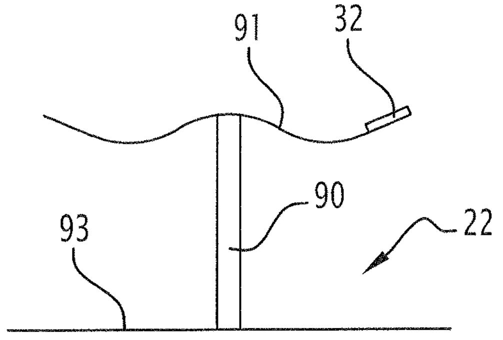
FIG. 23 is a schematic side view of a device for monitoring an access control system according to a third exemplary embodiment of the first embodiment of the described technology.

Referring back to FIGS. 1 to 3, the document reader 32 is positioned at one end, along the axis of the gate 22, of the stringer 91 of one of the delimitation members 36, and is oriented so as to face a user appearing at the entry of the gate 22. Alternatively, the document reader 32 is oriented so as to show its profile to a user appearing at the entry of the gate 22 (FIG. 22), or its tack (FIG. 23). Both of these last alternatives give the possibility of limiting access to the document reader 32 only to the users already engaged into the gate 22. This avoids that, in the case when two users appear subsequent to each other at the entry of the gate 22, the second user does not show his/her access document before the first user, which would has a consequence, an usurpation of the access document of the second user by the first user and a blocking of the second user in the gate 22. The flow of users through the gate 22 is thereby increased.

Figure 24:
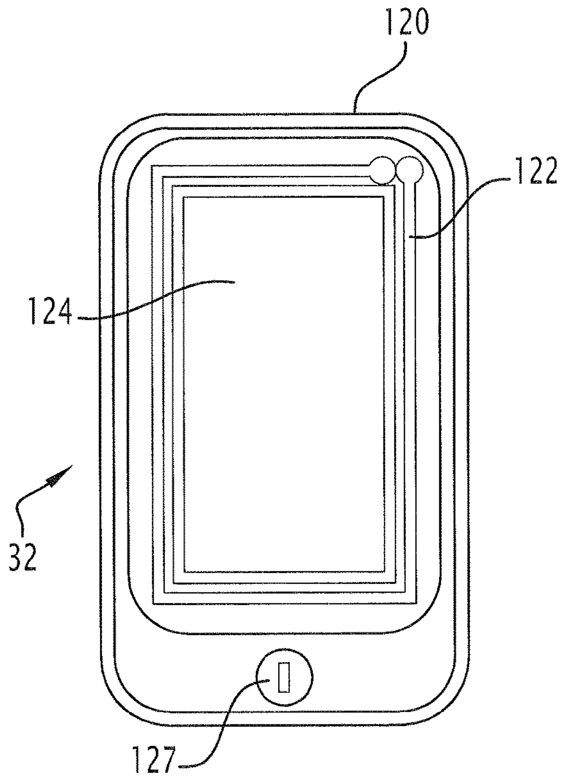
FIG. 24 is a front view of a document reader of the monitoring device of FIG. 2.
Figure 25:
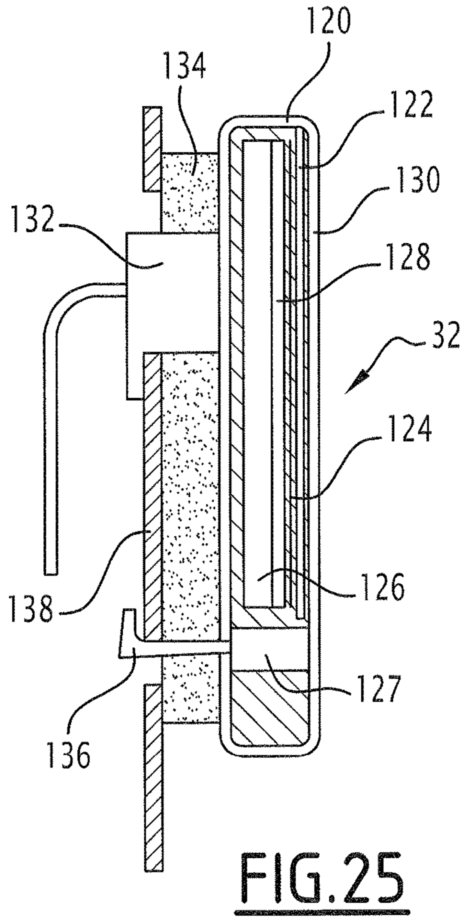
FIG. 25 is a sectional side view of the document reader of FIG. 24.
Figure 26:
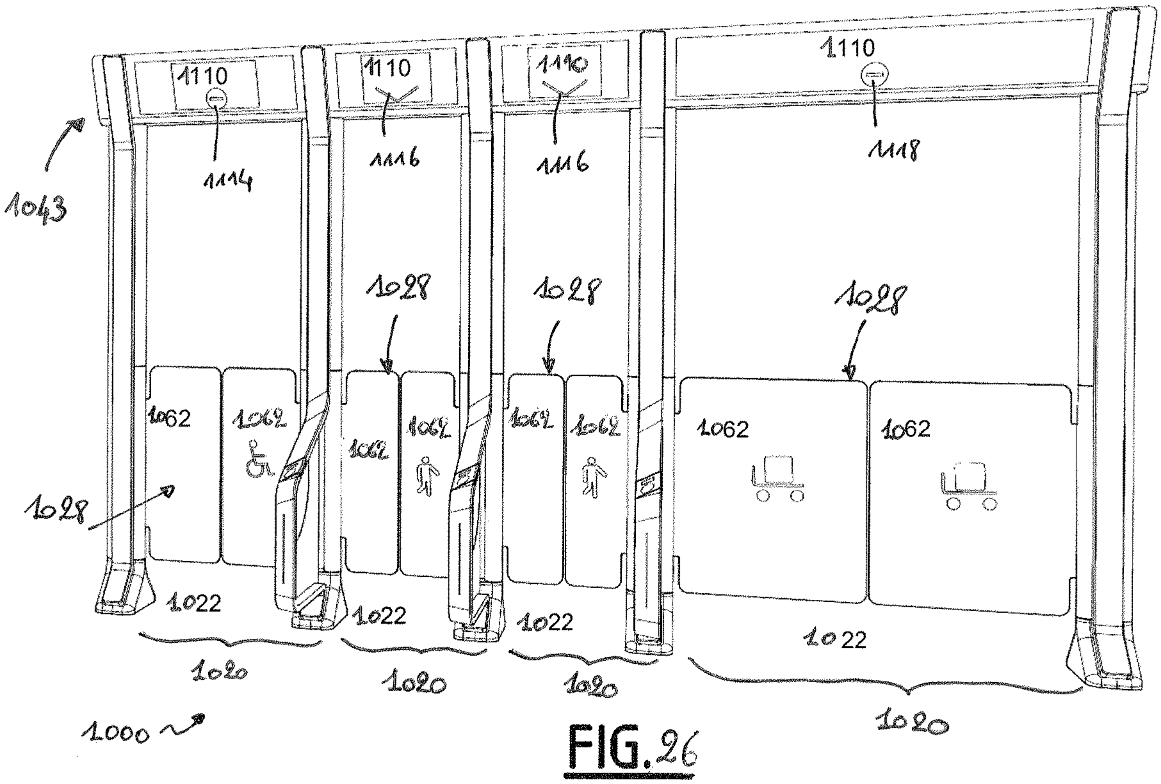
FIG. 26 is a perspective view of an access control system according to a first exemplary embodiment of the second embodiment of the described technology.

The document reader 32 is adapted for communicating with a contactless access document. For this purpose, it comprises, with reference to FIGS. 24 and 25, an antenna 122 and an electronic card 126. It further comprises a casing 120, a screen 124, a self-clamping lock 127, a ferrite layer 128 and optionally a loudspeaker (not shown).

The casing 120 contains the antenna 122, the screen 124, the electronic card 126, the loudspeaker, the self-clamping lock 127 and the ferrite layer 128. It has a window 130 at right angles to the screen 124, on one side of the casing 120 and, opposite to the window 130, it bears a first hook 132 protruding from the casing 120 opposite to the window 130. A foam layer 134 is desirably adhered, as illustrated, on the face of the casing 120 opposite to the window 130.

The antenna 122 is etched on a transparent and flexible substrate. It completes one turn of the screen 124. By this positioning of the antenna 122, it is possible to show the access document facing the screen 124.

The screen 124 is desirably flexible. For this purpose, the screen 124 is a screen made of organic light-emitting diodes.

The electronic card 126 is electrically connected to the antenna 122. It is adapted for reading and optionally writing data into the memory of a contactless media, for example of the type CSC (Contactless Smart Card) or of the type NFC (Near Field Communication), via the antenna 122. The electronic card 126 is also adapted for communicating with the control module 26.

The ferrite layer 128 is interposed between the antenna 122 and any metal mass which may interfere with the magnetic field generated by the antenna 122, for example the stringer 91 or the electronic card 126. It is positioned behind the screen 124 in order not to conceal it.

The loudspeaker is for example a flat and flexible loudspeaker, better known under the acronym of FFL (Flat Flexible Loudspeaker).

The lock 127 comprises a return member, typically a torsional spring, adapted for returning the lock 127 into a locking configuration. It is connected to a second hook 136 protruding from the same face of the casing 120 as the first hook 132, in the same direction, so that the first and second hooks 132, 136 are curved towards each other. The lock 127 is adapted for moving the second hook 136 away from the first hook 132 when it is in an unlocking configuration, and for bringing the hooks 132, 136 closer when it is in a locking configuration.

The document reader 32 is mounted on a support 138 secured to the stringer 91 so that the hooks 132, 136 clamp between them said support 138, the foam layer 134 being compressed between the casing 120 and the support 138.

Referring back to FIGS. 1 to 3, the sensor 34 is positioned vertically above the gate 22. It is adapted for counting the number of users present in a detection area 140 of the sensor 34, said area 140 being comprised in the gate 22. For this purpose, the sensor 34 for example comprises a TOF (Time Of Flight) camera observing the detection area 140.

The sensor 34 is adapted so as to communicate with the control module 26.

The sound emission member 38 is for example a loudspeaker. It is adapted for communicating with the control module 26.

The control module 26 is programmed so as to infer, from the data read by the document reader 32 into the memory of an access document, whether the user owner of the access document is authorized to use the gate 22 or not. The control module 26 thus forms, with the document reader 32, a system for authorizing circulation.

The control module 26 is also programmed for controlling the change in state of the obstacle 62 and of the display device 30 depending on whether it was determined that the user owner of the access document is authorized to use the gate 22 or not. In particular, the control module 26 is programmed so as to control the displacement of the movable members 70 in a retracted position and the display of information related to the authorization of passing through the gate 22 by the displays 110 and by the screen 124 when it has been determined that the user owner of the access document is authorized to use the gate 22, and for controlling the deployment of the movable members 70 and the display of information related to the prohibition of passing through the gate 22 by the displays 110 when it was determined that the user owner of the access document is not allowed to use the gate 22. The control module 26 thus forms with the device for obstruction of the gate 28, the display device on the ground 30 and the screen 124, a signing system adapted for showing the user whether he/she is either authorized or not to use the gate 22.

Moreover, the control module 26 is programmed so as to compare the data read by the document reader 32 with the number of users detected by the sensor 34 and to infer therefrom if required, a fraudulent attempt. In particular, the control module 26 is programmed for counting a number of presentations, in a predetermined time interval, of valid access documents to the document reader 32, in order to compare this number of presentations with the number of users present in the area 140, and for inferring:

absence of fraud when the number of presentations is greater than or equal to the number of users, and a fraudulent attempt when the number of presentations is less than the number of users.

The control module 26 thus forms, with the sensor 34, a fraud detection system.

Finally, the control module 26 is programmed for controlling the display of information related to the signaling of an unauthorized maneuver by the displays 110, as well as the emission of a sound alarm by the sound emission member 38, when it is inferred that a fraudulent attempt is being accomplished. The control module 26 thus forms, with the display device 32 and the sound emission member 38, an alarm system.

Always with reference to FIG. 1, the access control system 10 also comprises a system 150 for ventilation of the cavity 42, a power supply cable 152 for electric connection of each monitoring device 20 to an electricity network, and a cable for transferring data 154 for exchanging data between each monitoring device 20 and a central data collection system (not shown).

The ventilation system 150 comprises an air suction system 160, positioned on the outside of the cavity 42, and a ventilation conduit 162 fluidically connecting the air suction system 160 to the cavity 42. The ventilation system 150 also comprises a plurality of air intakes 164 for entering air into the cavity 42.

The suction system 160 is a conventional air suction system and will not be described here.

The ventilation conduit 162 extends through one of the fixed obstacles 16. It forms a grommet for the power supply cables 152 and the data transfer cables 154.

Each air intake 164 is formed with an air intake orifice formed in one of the delimitation members 36 of each monitoring device 20 and which is in fluidic communication with the cavity 42. Thus, the air entering the cavity 42 is taken in height, which allows better renewal of the air inside the cavity 42. For this purpose, the post 90 of said delimitation member 36 is desirably hollow.

The power supply cable 152 is electrically connected to the socket 44 of the compartment 40 of each monitoring device 20.

The access control system 1000, illustrated in FIGS. 26 to 29, is intended to control the entry of users into a restricted area 1012. Alternatively, the access control system 1000 is intended to exclusively control the exit, or the entry and the exit of users in the restricted area 1012.

For this purpose, the access control system 1000 comprises a plurality of monitoring devices 1020 juxtaposed to each other so as to isolate the restricted area 1012 of a free area 1014, any user passing from the restricted area 1012 to the free area 1014 necessarily having to use a pedestrian gate 1022 specific to one of the monitoring devices 1020.

The restricted area 1012 is typically an inside space of a building, a common transportation network, or an amusement park. It is reserved for the possessors of a valid access document.

Each monitoring device 1020 is adapted for monitoring the entry into the restricted area 1012 of users using the pedestrian gate 1022 specific to the monitoring device 1020. Alternatively, each monitoring device 1020 is adapted for exclusively controlling the exit, or the entry and exit of users passing through the pedestrian gate 1022.

By "pedestrian" gate, it is understood that each gate 1022 is adapted for the passing of a pedestrian, desirably an armchair pedestrian, and of his/her luggage, but not of an automobile. For this purpose, each gate 1022 typically has a width comprised between 40 cm and 80 cm.

Figure 31:
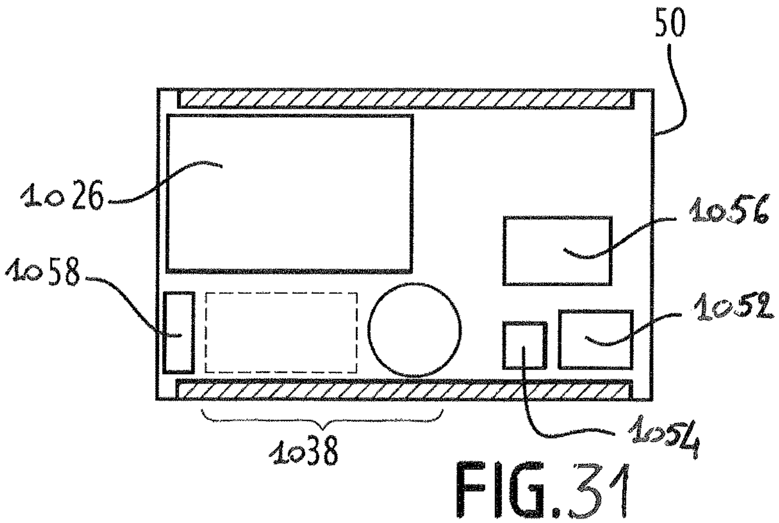
FIG. 31 is a schematic top view of a module for controlling the monitoring device of FIG. 28.

Each monitoring device 1020 comprises a power supply module 1024, a control module 1026, a passage 1022 obstruction device 1028 specific to the monitoring device 1020, two members 1036 for delimiting lateral edges of the gate 1022, a sensor 1034, and a device for interacting with the user comprising a display device 1030, a document reader 1032 and a sound emission member 1038 (FIG. 31).

The power supply module 1024 is adapted for shaping an electric current for powering the monitoring device 1020, so as to provide a stable electrical power supply without any cutoffs with the remainder of the monitoring device 1020. This type of power supply module is known and is generally designated under the name of interruption-free power supply, or UPS (Uninterruptible Power Supply).

The power supply module 1024 is housed in a first compartment 1040 positioned in a cavity 1042 extending above the gate 1022 specific to the monitoring device 1020. In the illustrated example, the cavity 1042 is common to all the monitoring devices 1020 and extends above all the gates 1022.

The cavity 1042 is in particular formed by the inside of a hollow beam 1043 positioned above the gate 1022 and oriented transversely to said gate 1022. In the illustrated example, this hollow beam 1043 has a substantially trapezoidal section with rounded angles.

Figure 30:
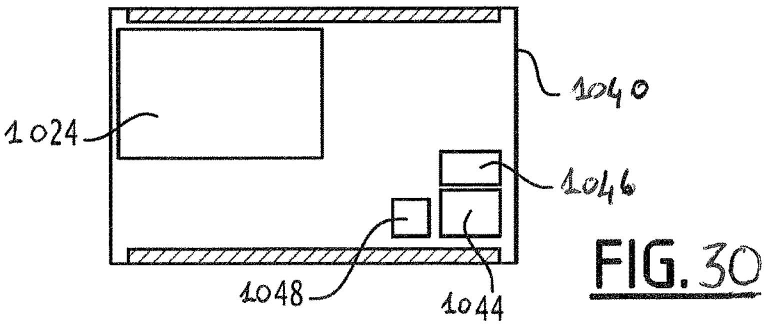
FIG. 30 is a schematic top view of a module for supplying power to the monitoring device of FIG. 28.

With reference to FIG. 30, the compartment 1040 contains, in addition to the power supply module 1024, an outlet 1044 for connecting to an electricity network powering the access control system 1000, an exit socket 1046 for the shaped electric current, and a maintenance socket 1048, the power supply module 1024 being electrically connected to each of the sockets 1044, 1046, 1048.

Referring back to FIGS. 26 to 29, the control module 1026 is a computer, for example an industrial computer adapted so as to be powered with a 12 V voltage. It has a capability (not shown) for communicating with the obstruction device 1028, the display device 1030, the document reader 1032, the sensor 1034 and the sound emission member 1038.

The control module 1026 is housed in a second compartment 1050 positioned in the cavity 1042.

With reference to FIG. 31, said compartment 1050 contains, in addition to the control module 1026, a power supply socket 1052 electrically connected to the output socket 1042 of the compartment 1040, a maintenance socket 1054, a transformer 1056 for adapting the provided current to the power supply socket 1052 to the power supply voltage of the control module 1026, a keyboard 1058, for programming the control module 1026, and the sound emission member 1038.

Each delimitation member 1036 is common to the monitoring device 1020 and to one of the monitoring devices 1020 which is adjacent to it, except in the cases when the monitoring device 1020 is only juxtaposed to a single other monitoring device 1020, in which case only one of the delimitation members 1036 is common to the monitoring device 1020 and to a monitoring device 1020 which is adjacent to it.

Each delimitation member 1036 comprises a post 1090 and optionally, a stringer 1091. The post 1090 is oriented substantially vertically. The stringer 1091 is oriented substantially horizontally, parallel to the axis of the gate 1022. The stringer 1091 is at a distance from the floor 1093 of the gate 1022, and is borne by the post 1090.

Figure 39:
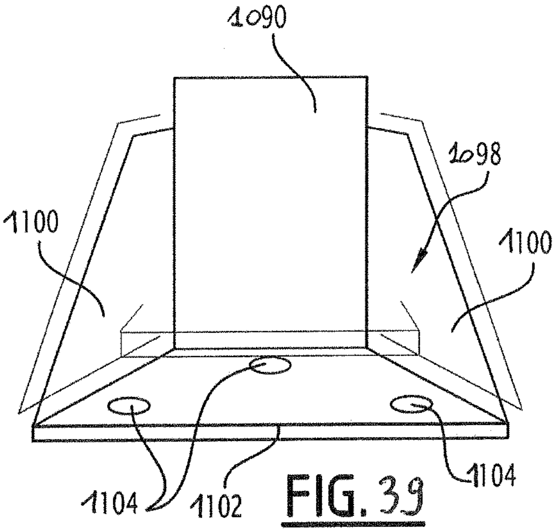
FIG. 39 is a perspective view of a device for attachment to the ground of a post of the gate obstruction device of FIG. 37.

Each post 1090 desirably has, as illustrated in FIG. 39, an elongated horizontal section parallel to the axis of the gate 1022.

Each post 1090 supports the hollow beam 1043.

Each post 1090 is desirably formed of steel.

Figure 40:
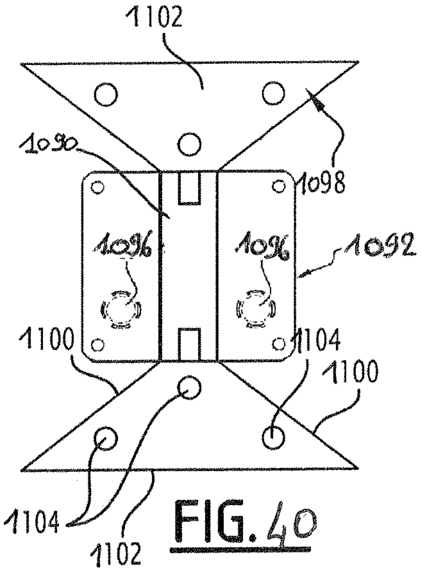
FIG. 40 is a top view of a portion of the monitoring device of FIG. 28.
Figure 41:
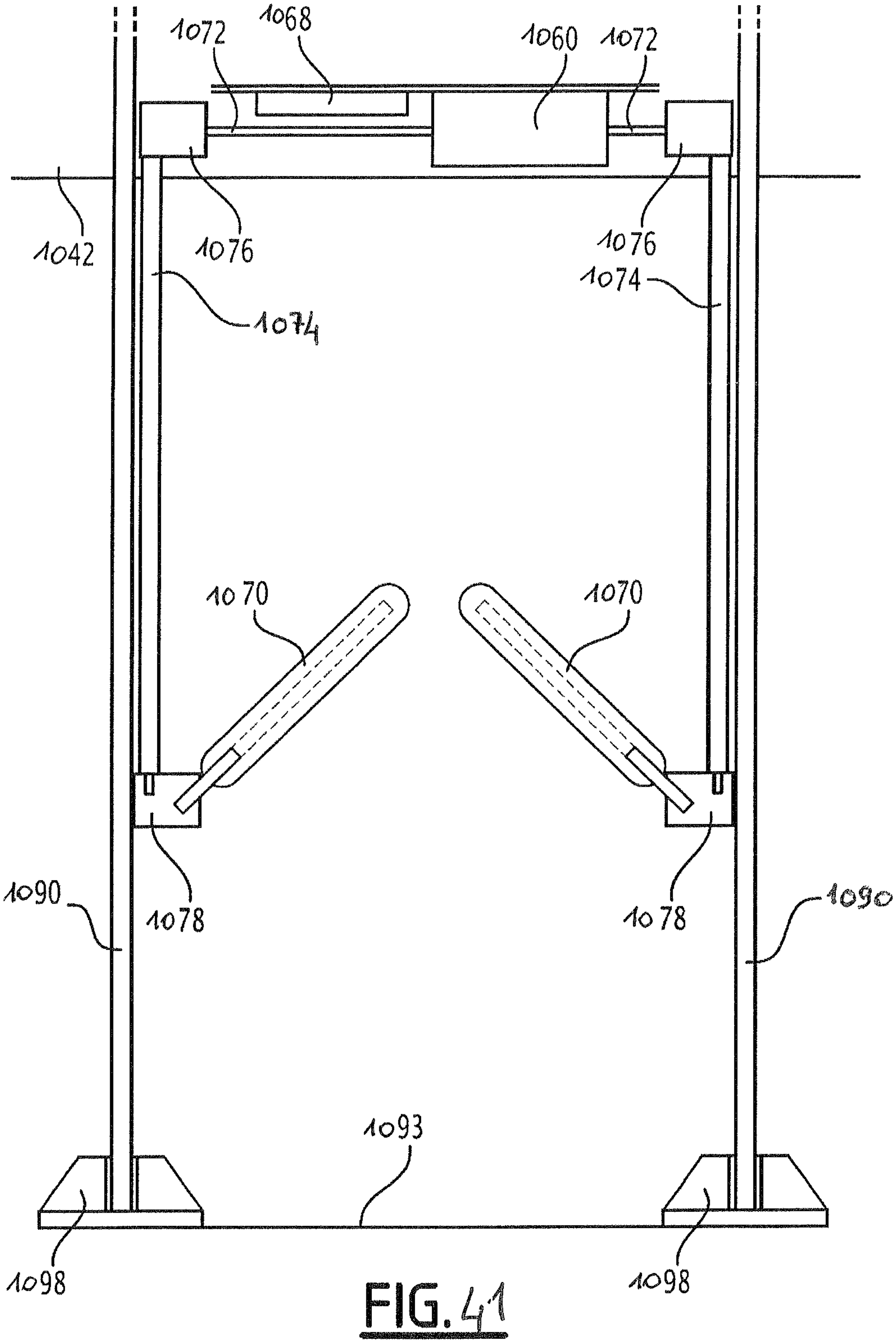
FIG. 41 is a schematic front view of a gate obstruction device of the monitoring device of FIG. 28, according to a second alternative, each of FIGS. 42 to 45 is a schematic front view of a gate obstruction device of the monitoring device of FIG. 28, according to a third alternative, each view showing a different condition of the obstruction device.
Figure 42:
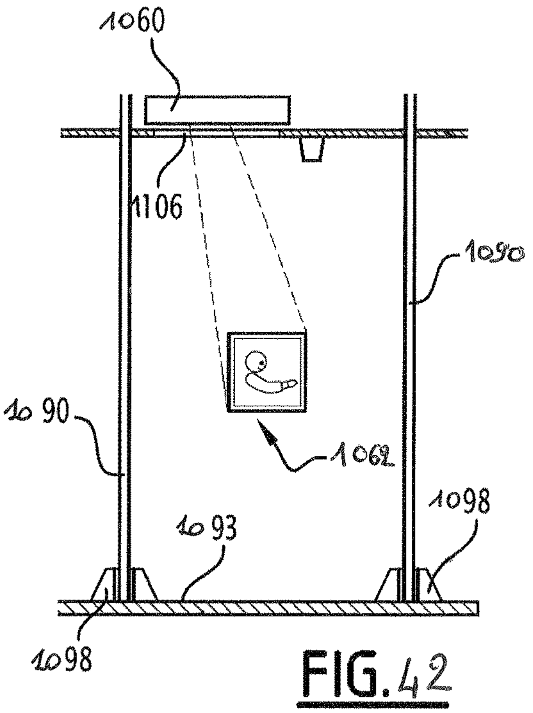
Figure 43:
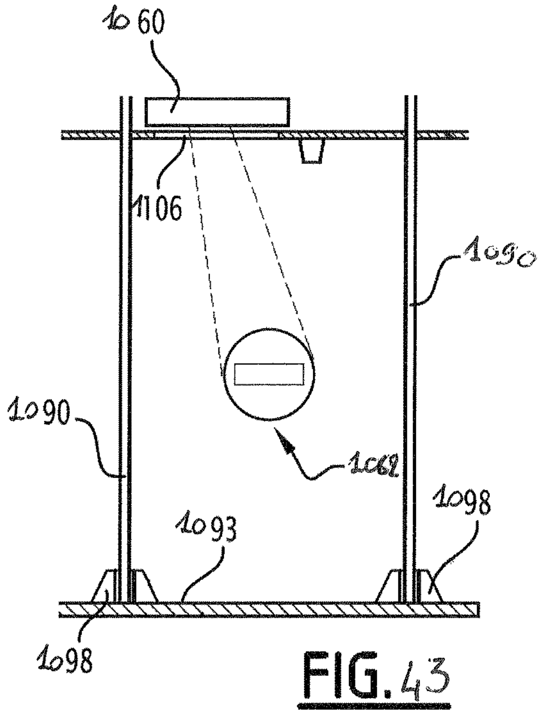
Figure 44:
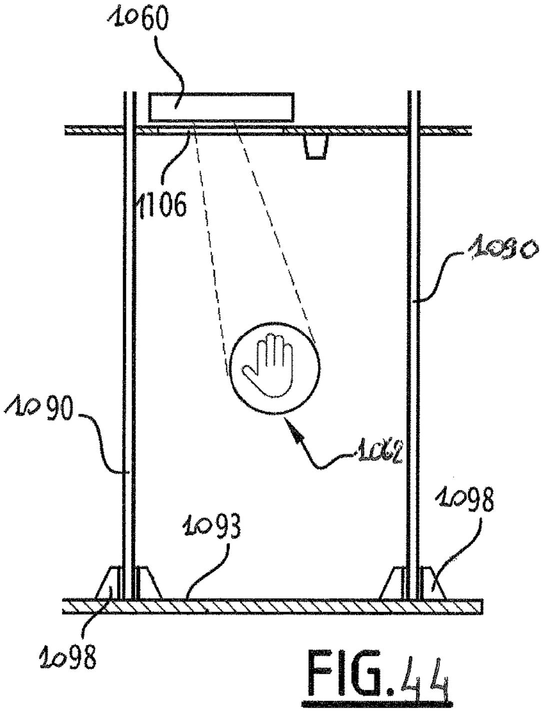

With reference to FIGS. 40 and 41, each post 1090 is held on the ground by two attachment devices 1098. These attachment devices 1098 are positioned on either side of the post 1090 along the axis of the gate 1022. Each attachment device 1098 is secured to a lower end of the post 1090.

Each attachment device 1098 is desirably formed of steel.

Each attachment device 1098 comprises two flanges 1100 forming between them an angle comprised between 90° and 160°, and a plate 1102 connecting the flanges 1100 to each other.

Each flange 1100 is oriented substantially vertically, and the plate 1102 is oriented substantially horizontally. The flanges 1100 converge towards the post 1090. This configuration of the attachment device 1098 allows good transmission of the forces exerted on the post 1090, along the axis of the gate 22, towards the ground. The resistance of the post 1090 to detachment is thus increased.

The plate 1102 has a plurality of orifices 1104 for letting through attachment members (not shown), for example screws, for attaching the plate 1102 to the ground.

The attachment devices 1098 are positioned on the ground.

Referring back to FIGS. 26 to 29, the obstruction device 1028 comprises an obstacle positioning device 1060, suitable for positioning an obstacle 1062 across the gate 1022 specific to the monitoring device 1020. This obstacle positioning device 1060 is housed in a third compartment 1064 positioned in the cavity 1042.

Figure 32:
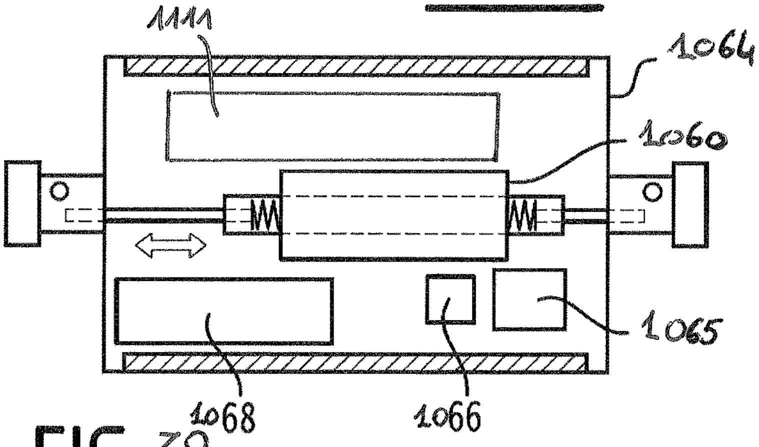
FIG. 32 is a schematic top view of an obstacle positioning device of the monitoring device of FIG. 28.

With reference to FIG. 32, the compartment 1064 contains, in addition to the obstacle positioning device 1060, a power supply socket 1065 electrically connected to the output socket 1042 of the compartment 1040, a maintenance socket 1066, and an electric converter 1068 for converting the current provided to the power supply socket 1065 into a current suitable for powering the obstacle positioning device 1060.

According to a first exemplary embodiment of the second embodiment of the described technology, illustrated in FIGS. 32 to 41, the obstacle 1062 comprises at least one movable member 1070 between a deployed position, in which it extends through the gate 1022, and a retracted configuration, in which it is disengaged from said gate 1022, and the obstacle positioning device 1060 is formed by an actuator mechanically connected to said or each movable member 1070 for driving it between its deployed configuration and its retracted configuration.

In the illustrated example, the obstacle 1062 is formed with two movable members 1070, said movable members 1070 being barriers. Alternatively, the movable members 1070 are gates.

Each barrier 1070 is adapted so as to be oriented horizontally and perpendicularly to the axis of the gate 1020 when it is in a deployed configuration, and:

according to a first alternative, illustrated in FIGS. 37 to 40, in order to be oriented parallel to the axis of the gate 1020 when it is in a retracted configuration, or according to a second alternative, illustrated in FIG. 41, in order to be oriented vertically when it is in a retracted configuration.

The actuator 1060 is an electric motor, for example a servomotor with variable speed. Desirably it has as many output shafts 1080 as there are movable members 1070. In the illustrated example, the actuator 1060 thus has two output shafts 1080. Alternatively, the obstacle 1062 is formed with a single movable member 1070, for example a gate, and the actuator 1060 then has a single output shaft 1080.

Figure 33:
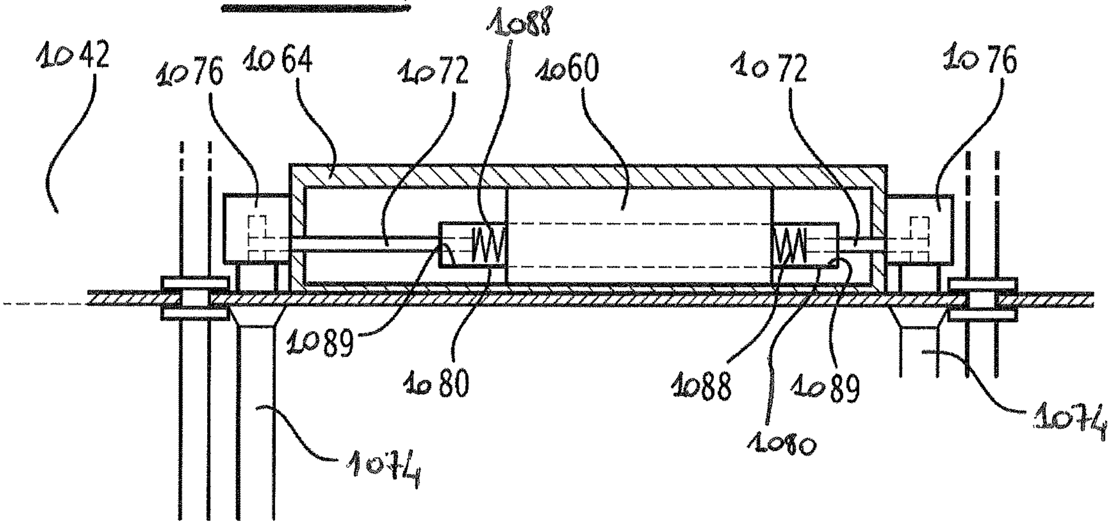
FIG. 33 is a schematic front view of the obstacle positioning device of FIG. 32.
Figure 34:
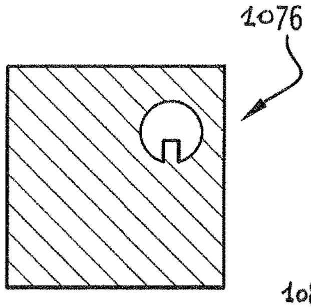
FIG. 34 is a schematic side view of an angled member of the obstacle positioning device of FIG. 32.
Figure 35:
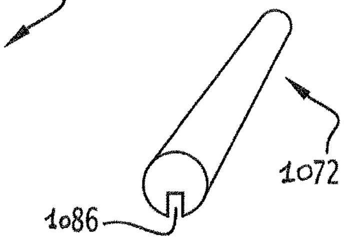
FIG. 35 is a schematic perspective view of an intermediate shaft of the obstacle positioning device of FIG. 32.
Figure 36:
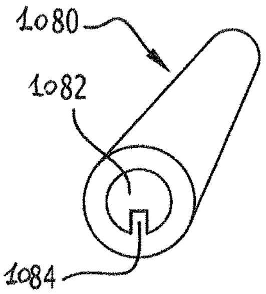
FIG. 36 is a schematic perspective view of a driving shaft of the obstacle positioning device of FIG. 32.
Figure 37:
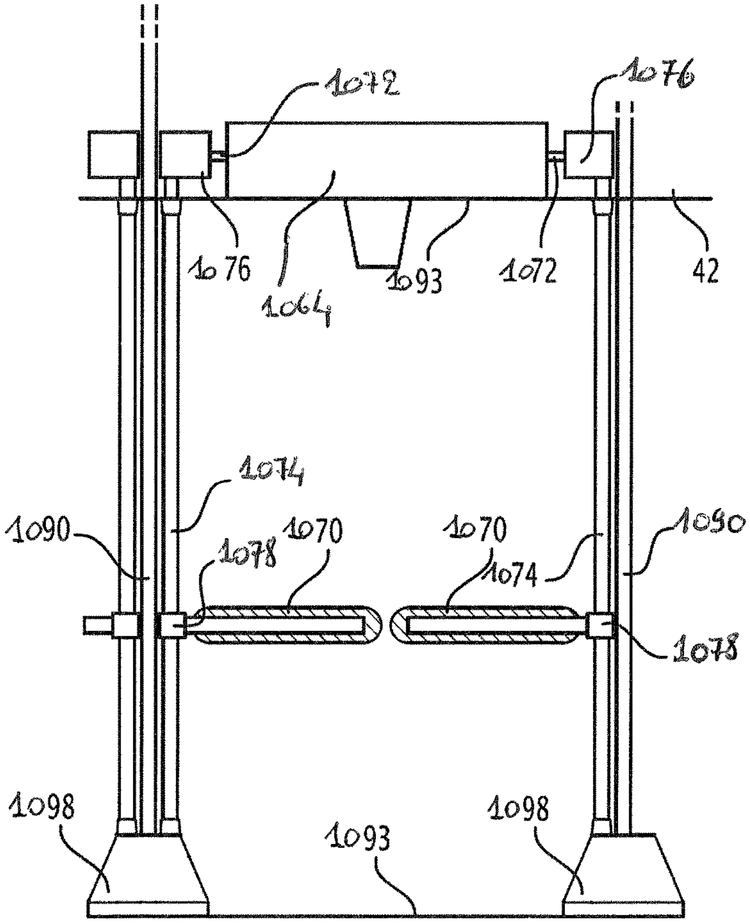
FIG. 37 is a schematic front view of a device for obstructing a gate of the monitoring device of FIG. 28, according to a first alternative.
Figure 38:
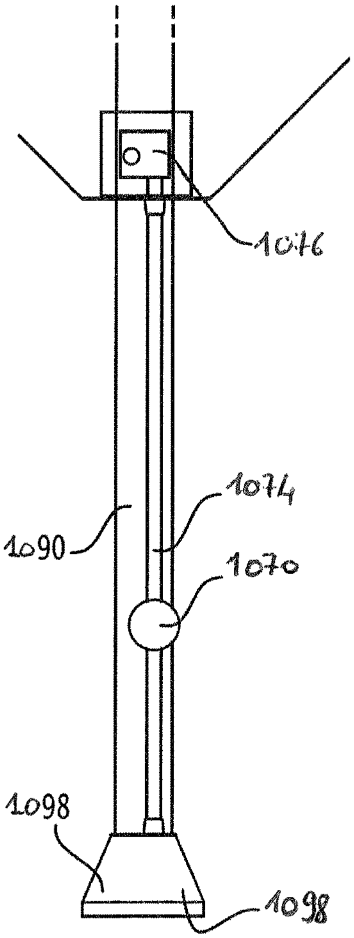
FIG. 38 is a schematic side view of the device for obstructing a gate of FIG. 37.

With reference to FIG. 33, the mechanical connection between the actuator 1060 and each movable member 1070 comprises an intermediate shaft 1072, substantially oriented horizontally and perpendicularly to the axis of the gate 1022, an obstacle shaft 1074, oriented substantially vertically, a first device 1076 for coupling the obstacle shaft 1074 to the intermediate shaft 1072, and a second device 1078 for coupling the obstacle shaft 1074 to the movable member 1070.

The intermediate shaft 1072 is secured in rotation around its axis of an output shaft 1080 of the actuator 1060. In the illustrated example, the output shaft 1080 defines a cavity 1082 for receiving the intermediate shaft 1072, and the coupling of the output shaft 1080 with the intermediate shaft 1072 is achieved by cooperation of a rib 1084 (FIG. 36) protruding radially from a wall of the cavity 1082 with an axial groove 1086 (FIG. 35) made in the intermediate shaft 1072. Referring back to FIG. 33, a compression spring 1088 is positioned in the cavity 1082 and presses against a bottom (not shown) of the cavity 1082 and against an end 1089 of the intermediate shaft 1072 so as to push the shaft 1072 outside the cavity 1082. This gives the possibility of facilitating the installation of the obstruction device 1028.

The obstacle shaft 1074 borders the post 1090 of one of the delimitation members 1036 of the monitoring device 1020.

The first coupling device 1076 is adapted so that the rotation of one of the shafts 1072, 1074 around its axis causes rotation of the other shaft 1072, 1074 around its axis. For this purpose, the first coupling device 1076 is for example an angled gearbox such as the gearbox Slide-Rite™ from Tolomatic.

According to the alternative of FIGS. 37 to 40, the second coupling device 1078 is a clamping ring, secured to the movable member 1070 and clamped around the obstacle shaft 1074. The movable member 1070 and the obstacle shaft 1074 are thus secured in rotation around the axis of the obstacle shaft 1074.

In order to rigidify the obstacle shaft 1074, the post 1090 bordered by said shaft 1074 then bears, at its lower end, a shoe 1092 (FIG. 40) defining an orifice 1094 for receiving an upper end 1096 of said obstacle shaft 1074. Thus, the obstacle shaft 1074 is held at its lower and upper ends, which avoids its flexing.

The shoe 1092 is in particular interposed between the devices 1098 for attaching the beam 1090, as illustrated in FIG. 40.

According to the alternative of FIG. 41, the second coupling device 1078 is adapted so that the rotation of the obstacle shaft 1074 around its axis causes rotation of the movable member 1070 around an axis substantially parallel to the axis of the gate 1022. For this purpose, the second coupling device 1078 is for example an angled gearbox like the gearbox Slide-Rite™ from Tolomatic.

In order to rigidify the obstacle shaft 1074, the second coupling device 1078 is secured to the post 1090 bordered by said shaft 1074. Thus, the obstacle shaft 1074 is held at its lower and upper ends which avoids its flexing.

The intermediate shafts 1072 are transversely aligned with each other. In other words, the axes of the intermediate shafts 1072 are comprised in a same vertical plane.

The obstacle shafts 1074 are transversely aligned with each other. In other words, the axes of the obstacle shafts 1074 are comprised in a same plane perpendicular to the axis of the gate 1022.

According to a second exemplary embodiment of the second embodiment of the described technology, illustrated in FIGS. 42 to 45, the obstacle 1062 is a hologram, and the obstacle positioning device 1060 is a hologram generator.

The hologram generator 1060 is adapted so as to generate the hologram 1062 so that it extends across the gate 1022. For this purpose, the hologram generator 1060 has on its underside a window (not shown) for projecting a hologram, and the hollow beam 1043 comprises a transparent portion 1106 extending facing said window.

Figure 45:
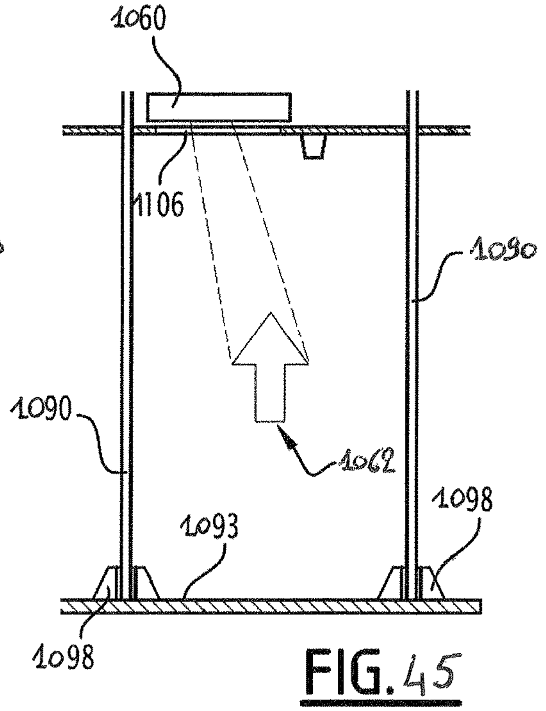

The hologram generator 1060 is adapted so as to give various aspects to the hologram 1062, according to whether the user is prompted to show an access document (FIG. 42), whether the crossing of the gate 1022 is forbidden (FIG. 43), whether the user has shown an invalid access document (FIG. 44) or whether the user has presented aa valid access document (FIG. 45).

The compartments 1040, 1050, 1064 are positioned above the gate 1022 and are juxtaposed to each other along the axis of the gate 1022. The compartment 1064 is at right angles to the obstacle 1062. The compartments 1040, 1050 are positioned on either side of the obstacle 1062.

Each compartment 1040, 1050, 1064 may be handled independently of the two other compartments 1040, 1050, 1064. It is thus possible to withdraw one of the compartments 1040, 1050, 1064 of the cavity 1042 while leaving the other compartments 1040, 1050, 1064 in the cavity 1042. It is also possible to switch the compartments 1040 and 1050, either upwards or downwards, thus allowing access to them without disassembling the beam 1043 for carrying out maintenance, this switching thus also releasing an access without disassembling to the compartment 1064, on either side of the latter. This allows easy replacement of the power supply module 1024, the control module 1026 or the obstacle positioning device 1028 without touching the other portions of the monitoring device 1020, or even suppressing the obstacle positioning device 1028. The monitoring device 1020 thus has great modularity.

Alternatively (not shown), the power supply module 1024, the control module 1026 and the obstacle positioning device 1060 are housed in a same compartment, said compartment for example being formed with the cavity 1042.

Referring back to FIGS. 26 to 29, the display device 1030 comprises a plurality of displays 1110 positioned above the gate 1022. In particular, each display 1110 is affixed on an external face of the hollow beam 1043.

Each display 1110 is for example a display with light-emitting diodes or backlit liquid crystals.

In the illustrated example, the display device 1030 also comprises a projector 1111 (FIG. 32) for projecting an image on a projection surface formed by the flooring of the gate 1022 or by a surface of a delimitation member 1036. This projector 1111 is desirably housed in the compartment 1064, as illustrated in FIG. 32. The hollow beam 1043 then comprises a transparent portion 1106 extending below the compartment 1064.

The display device 1030 also comprises a module (not shown) for controlling the displays 1110 and the projector 1111. The controlling module is programmed so as to control the display, with the displays 1110 and/or with the projector 1111, of information related to the availability of the gate 1022, to the authorization or to the prohibition of passing through the gate 1022, or to the signaling of an unauthorized maneuver, such as a fraudulent attempt. Optionally, the controlling module is programmed for controlling the display, with the displays 1110 and/or with the projector 1111, of messages of an informative nature, or advertising information, such as advertising videos or information on the traffic.

Figure 46:
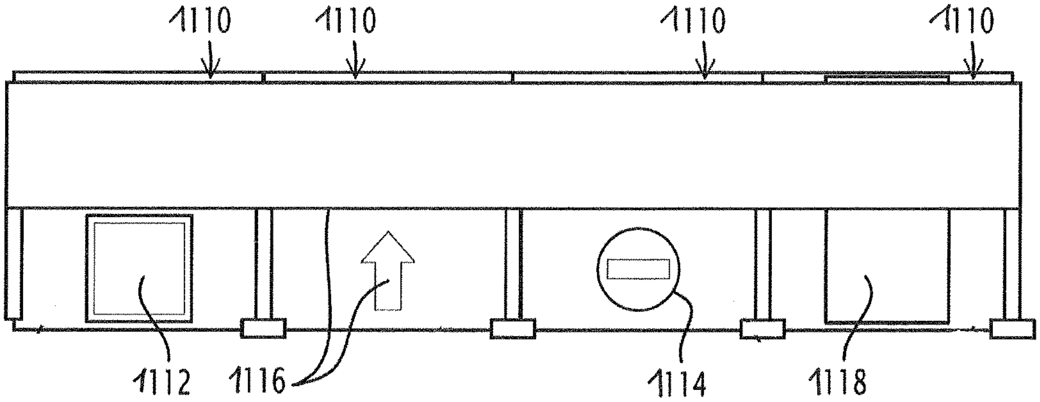
FIG. 46 is a view, similar to that of FIG. 27, of a portion of the access control system.

With reference to FIG. 46, the information related to the availability of the gate 1022 is for example shown as a pictogram 1112 illustrating a user showing an access document, when the gate 1022 is available, or a “no entry” panel 1114 when the gate 1022 is unavailable. The information related to the authorization of passing through the gate 1022 are for example shown as green arrows 1116 oriented in the direction of displacement of the user having shown his/her access document. The information related to the signaling of an unauthorized maneuver are for example shown as a blinking 1118 in an alarming color, such as orange or red, of the entirety of the display surface area of the displays 1110 and/or of the projection surface of the projector 1111.

Figure 47:
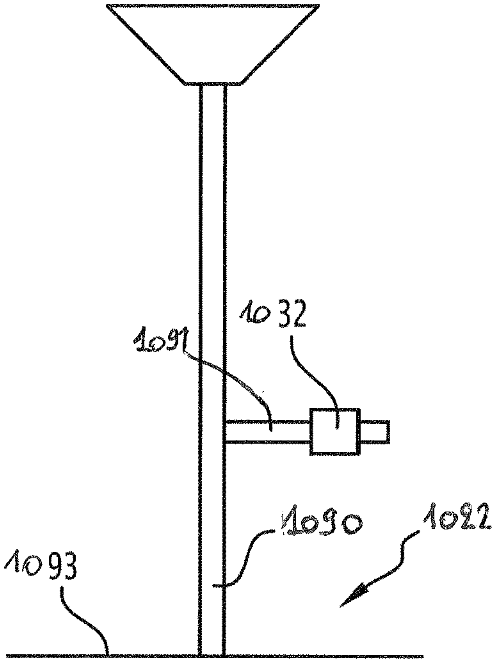
FIG. 47 is a schematic side view of a device for monitoring an access control system according to a second exemplary embodiment of the second embodiment of the described technology.
Figure 48:
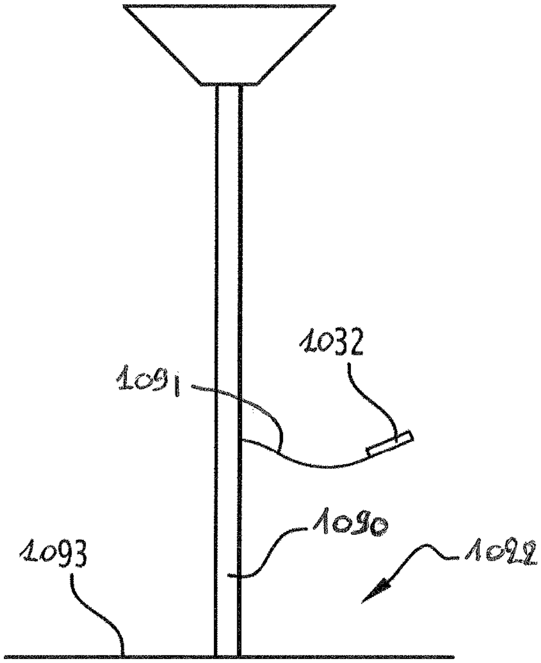
FIG. 48 is a schematic side view of a device for monitoring an access control system according to a third exemplary embodiment of the second embodiment of the described technology.

Referring back to FIGS. 26 to 29, the document reader 1032 is positioned at one end, along the axis of the gate 1022, of the stringer 1091 of one of the delimitation members 1036, and is oriented so as to face a user appearing at the entry of the gate 1022. Alternatively, the document reader 1032 is oriented so as to show its profile to a user appearing at the entry of the gate 1022 (FIG. 47), or its back (FIG. 48). Both of these last alternatives give the possibility of limiting access to the document reader 1032 to the sole users already engaged in the gate 1022. This avoids that, in the case when two users appear subsequently to each other at the entry of the gate 1022, the second user does not show his/her access document before the first user, which would have the consequence of usurpation of the access document of the second user by the first user and blocking of the second user in the gate 1022. The flow of users through the gate 1022 is thereby increased.

The document reader 1032 is adapted for communicating with a contactless access document. For this purpose, the document reader 1032 is identical with the document reader 32.

The sensor 1034 is positioned vertically above the gate 1022. It is adapted for counting the number of users present in a detection area 1140 of the sensor 1034, said area 1140 being comprised in the gate 1022. For this purpose, the sensor 1034 for example comprises a Time Of Flight camera (TOF camera) observing the detection area 1140.

The sensor 1034 is adapted for communicating with the control module 1026.

The sound emission member 1038 is for example a loudspeaker. It is adapted for communicating with the control module 1026.

The control module 1026 is programmed for inferring, from the data read by the document reader 1032 into the memory of an access document, whether the user owner of the access document is authorized to use the gate 1022 or not. The control module 1026 thus forms, with the document reader 1032, a system for authorization of circulation.

The control module 1026 is also programmed for controlling the change of state of the obstacle 1062 and of the display device 1030 according to whether it was determined that the user owner of the access document is authorized to use the gate 1022 or not. In particular, the control module 1026 is programmed for controlling the displacement of the movable members 1070 in a retracted position and the display of information related to the authorization of passing through the gate 1022 by the displays 1110, by the projector 1111 and by the screen 124 when it was determined that the user owner of the access document is authorized to use the gate 1022, and for controlling the deployment of the movable members 1070 and the display of information related to the prohibition of passing through the gate 1022 by the displays 1110 and by the projector 1111 when it was determined that the user owner of the access document is not authorized to use the gate 1022. The control module 1026 thus forms, with the device for obstruction of the gate 1028, the display device on the ground 1030 and the screen 124, an adapted signing system for informing the user whether he/she is either authorized or not to use the gate 1022.

Moreover, the control module 1026 is programmed for comparing the data read by the document reader 1032 with the number of users detected by the sensor 1034 and for inferring therefrom, if necessary, a fraudulent attempt. In particular, the control module 1026 is programmed for counting a number of presentations, within a predetermined time interval, of valid access documents to the document reader 1032, in order to compare this number of presentations with the number of users present in the area 1140, and for reducing:

an absence of fraud when the number of presentations is greater than or equal to the number of users, and a fraudulent attempt when the number of presentations is less than the number of users.

The control module 1026 thus forms, with the sensor 1034, a fraud detection system.

Finally, the control module 1026 is programmed for controlling the display of information related to the signaling of an unauthorized maneuver by the displays 1110 and by the projector 1111, as well as the emission of a sound alarm by the sound emission member 1038, when it is inferred that a fraudulent attempt is being carried out. The control module 1026 is also programmed for controlling the illumination of the fraudster by the projector 1026 when it is inferred that a fraudulent attempt is being carried out. The control module 1026 thus forms, with the display device 1032 and the sound emission member 1038, an alarm system.

Figure 27:
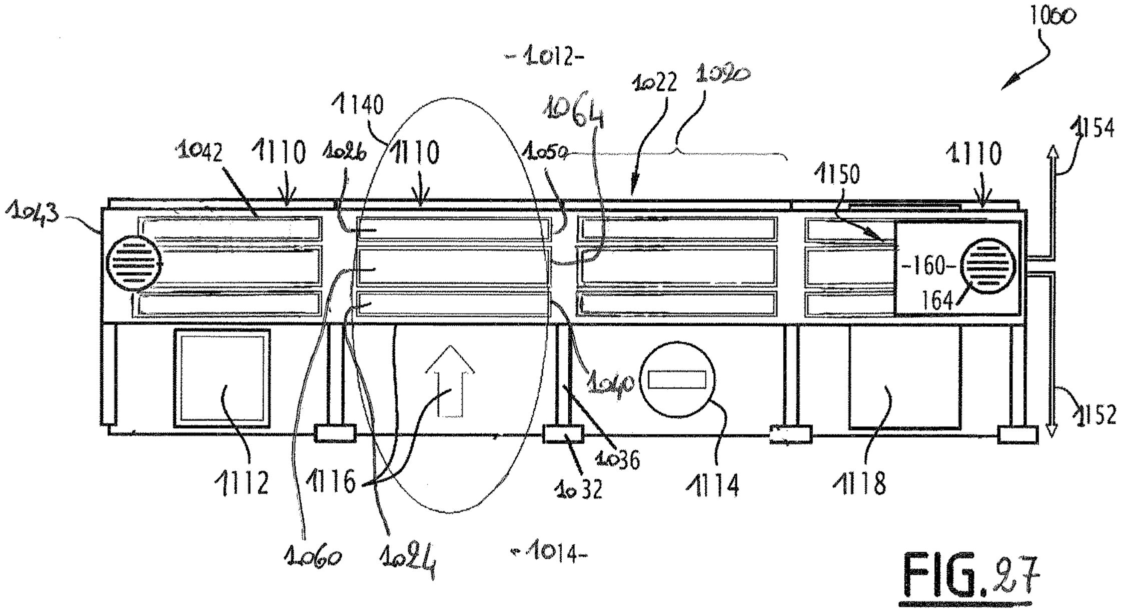
FIG. 27 is a schematic top view of the access control system of FIG. 26.
Figure 28:
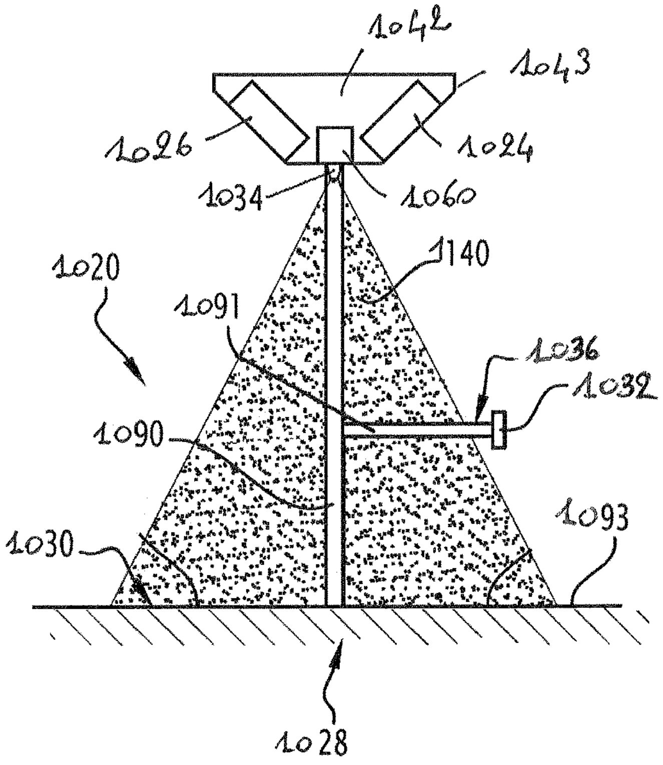
FIG. 28 is a schematic side view of a device for monitoring the access control system of FIG. 26.
Figure 29:
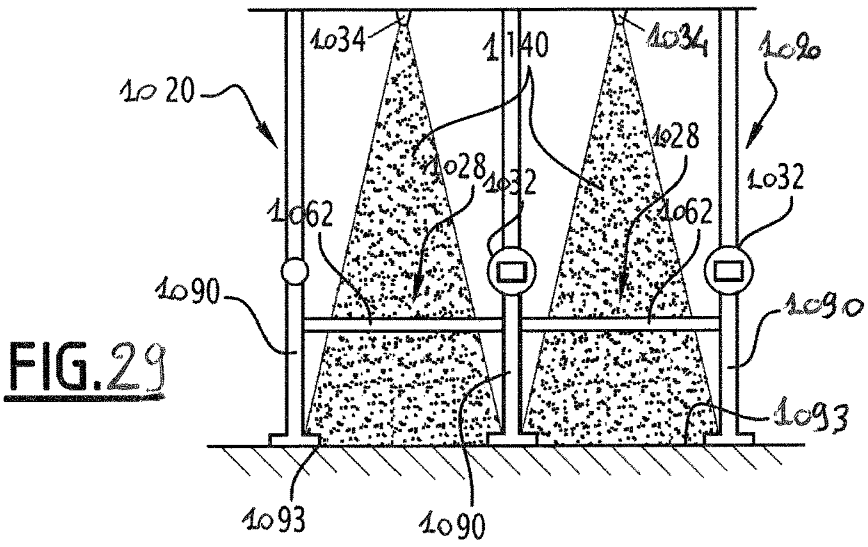
FIG. 29 is a schematic front view of a portion of the access control system of FIG. 26.

Always with reference to FIG. 27, the access control system 1000 also comprises a system 1150 for ventilation of the cavity 1042, a power supply cable 1152 for electrically connecting each monitoring device 1020 to an electricity network, and a data transfer cable 1154 for exchanging data between each monitoring device 1020 and a central data collection system (not shown).

The ventilation system 1150 comprises an air suction or injection system 1160, positioned on the outside or inside the cavity 1042, in fluidic communication with the cavity 1042. The ventilation system 1150 also comprises a plurality of air intakes 1164 for the entry or exit of air in the cavity 1042. Each air intake 1164 is desirably provided with a removable filter (not shown) intended to avoid accumulation of dust in the cavity 1042.

The suction or injection system 1160 is a standard air injection or suction system and will not be described here.

Each air intake 1164 is formed by an air intake orifice formed in a wall of the hollow beam 1043. Thus, the air entering the cavity 1042 is taken in height, which allows better renewal of the air inside the cavity 1042.

The power supply cable 1152 is electrically connected to the socket 1044 of the compartment 1040 of each monitoring device 1020.

By means of the technology described above, the size of each of the monitoring devices 20, 1020 is reduced. A larger number of monitoring devices 20, 1020 is thus juxtaposed in a same space, and thus the pedestrian flow who may pass through said space is thereby increased.

Further, each access control system 10, 1000 has great modularity in so far that it is easy to replace a compartment 40, 50, 64, 1040, 1050, 1064 of one of the monitoring devices 20, 1020 independently of the other compartments 40, 50, 64, 1040, 1050, 1064 of said monitoring device 20, 1020.

Finally, as the shape of the delimitation members 36, 1036 is no longer constrained by the requirement of protecting the equipment present inside, it is possible to produce delimitation members of various shapes and adapted to the environment in which the access control system 10, 1000 is used. It is also possible to use for these delimitation members non-conventional materials.

It will be noted that, although the described technology has been described as two embodiments distinct from each other, the described technology also extends to any combination of these two embodiments. Thus, one object of the described technology is also any access control system mixing the features of both embodiments described earlier, according to any technically possible combination of features. Thus, one object of the described technology is notably an access control system in which only a portion of the power supply modules, control module and obstacle positioning device will be housed under the gate, the remainder of said power supply module, control module and obstacle positioning device being housed above the gate.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. An access control system for controlling access to a restricted area, comprising at least one monitor configured to monitor entry and/or exit in the restricted area of users using a pedestrian gate, specific to the monitor, the gate comprising a space for the crossing of a pedestrian with his/her luggage, for the entry and/or the exit in the restricted area, the monitor comprising:

a circulation authorization system, comprising a central unit and at least one document reader, the at least one document reader being configured to communicate with an access document of a user, and the central unit being configured to determine whether the user of the access document is authorized to use the gate, and a signing system configured to show the user whether he/she is authorized or not to use the gate, the signing system comprising at least one peripheral configured to change state and a control module configured to control the at least one peripheral, the control module being configured to control the change of the state of the at least one peripheral when the central unit of the circulation authorization system has determined that the user of the displacement document is authorized to use the gate, wherein the control module is housed in a control compartment above the gate and vertically aligned with the gate, wherein the at least one peripheral of the signing system comprises an obstructer for obstructing the gate comprising an obstacle positioner configured to position an obstacle across the gate, the obstacle positioner being housed in a signing compartment above the gate and vertically aligned with the gate, and wherein the obstacle comprises at least one movable member movable between a deployed configuration, in which the at least one movable member extends across the gate, and a retracted configuration, in which the at least one movable member is disengaged from the gate, the obstacle positioner being formed by an actuator mechanically connected to the at least one movable member configured to drive the at least one movable member between the deployed configuration and the retracted configuration.

2. The access control system according to claim 1, wherein the obstacle comprises a hologram, and the obstacle positioner comprises a hologram generator.

3. The access control system according to claim 1, wherein the at least one peripheral of the signing system comprises a display, the display being housed above the gate.

4. The access control system according to claim 1, wherein the at least one monitor comprises a power supply module configured to supply power to the monitor and shape an electric current powering the monitor, the power supply module being housed in a power supply compartment above the gate.

5. The access control system according to claim 1, comprising a ventilation system for ventilation of the control compartment, the ventilation system comprising an air injection or suction system fluidically connected to the control compartment for generating air circulation in the control compartment.

6. The access control system according to claim 1, wherein the at least one monitor comprises a sensor configured to detect the user present in a detection area of the sensor, the detection area comprising at least one portion of the gate.

7. The access control system according to claim 1, comprising a plurality of monitors juxtaposed to each other.

* * * * *